(12) United States Patent
Matsuda

(10) Patent No.: US 9,308,829 B2
(45) Date of Patent: Apr. 12, 2016

(54) STRADDLE ELECTRIC VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/354,538

(22) PCT Filed: Oct. 28, 2011

(86) PCT No.: PCT/JP2011/006059
§ 371 (c)(1),
(2), (4) Date: May 27, 2014

(87) PCT Pub. No.: WO2013/061385
PCT Pub. Date: May 2, 2013

(65) Prior Publication Data
US 2014/0299393 A1    Oct. 9, 2014

(51) Int. Cl.
*B60R 16/04* (2006.01)
*B60L 11/18* (2006.01)
(Continued)

(52) U.S. Cl.
CPC .............. *B60L 11/1877* (2013.01); *B60K 1/04* (2013.01); *B60L 11/1803* (2013.01); *B62J 9/00* (2013.01);
(Continued)

(58) Field of Classification Search
CPC ....... B60R 16/04; H01M 2/1083; B60K 1/04; B60K 2001/0422; B60L 11/1877; B60L 11/1803; B62J 9/00; B62K 11/04; B62K 11/02; B62K 19/30; B62K 2204/00; B62K 2208/00; B62M 6/90
USPC ...................................................... 180/68.5
See application file for complete search history.

(56) References Cited

U.S. PATENT DOCUMENTS 4,091,187 A * 5/1978 Kaye .............................. 429/159
4,599,283 A * 7/1986 Thiele et al. .................... 429/99
(Continued)

FOREIGN PATENT DOCUMENTS

CN    1579877 A    2/2005
JP    2003267283 A    9/2003
(Continued)

OTHER PUBLICATIONS

ISA Japanese Patent Office, International Search Report of PCT/JP2011/006059, WIPO, Jan. 24, 2012, 4 pages.
(Continued)

*Primary Examiner* — Hau Phan
*Assistant Examiner* — Jacob Meyer
(74) *Attorney, Agent, or Firm* — Alleman Hall McCoy Russell & Tuttle LLP

(57) ABSTRACT

A straddle electric vehicle which rotates a drive wheel by driving power generated in an electric motor, comprises a battery unit which is an electric power supply; and a battery case for storing the battery unit; wherein the battery case includes a pair of first case member and second case member which are joined together such that the first case member and the second case member are horizontally separable from each other, and a parting line of the first case member and the second case member extends above a bottom wall of the battery case; and wherein the first case member and the second case member include a first flange section and a second flange section, respectively, which define the parting line, and are separably joined to each other in a state in which the first flange section and the second flange section are engaged with each other.

13 Claims, 13 Drawing Sheets

(51) Int. Cl.
  *B62J 9/00* (2006.01)
  *B62K 11/04* (2006.01)
  *B62K 19/30* (2006.01)
  *B60K 1/04* (2006.01)
  *B62M 6/90* (2010.01)
  *B62K 11/02* (2006.01)

(52) U.S. Cl.
  CPC .............. *B62K 11/04* (2013.01); *B62K 19/30* (2013.01); *B60K 2001/0422* (2013.01); *B62K 11/02* (2013.01); *B62K 2204/00* (2013.01); *B62K 2208/00* (2013.01); *B62M 6/90* (2013.01)

(56) References Cited

U.S. PATENT DOCUMENTS

| | | | | |
|---|---|---|---|---|
| 4,981,490 | A * | 1/1991 | Machida | 29/623.2 |
| 5,293,951 | A * | 3/1994 | Scott | 180/68.5 |
| 5,421,427 | A * | 6/1995 | Ogawa et al. | 180/220 |
| 5,441,123 | A * | 8/1995 | Beckley | 180/68.5 |
| 5,536,595 | A * | 7/1996 | Inkmann et al. | 429/120 |
| 5,577,747 | A * | 11/1996 | Ogawa et al. | 180/220 |
| 5,681,668 | A * | 10/1997 | Reed et al. | 429/100 |
| 5,709,963 | A * | 1/1998 | Sim | 429/99 |
| 5,744,260 | A * | 4/1998 | Sim | 429/99 |
| 6,186,256 | B1 * | 2/2001 | Dignitti | 180/68.5 |
| 7,117,966 | B2 * | 10/2006 | Kohda et al. | 180/68.5 |
| 7,232,171 | B2 | 6/2007 | Lan et al. | 296/37.1 |
| RE40,848 | E | 7/2009 | Pitzen et al. | 429/100 |
| 7,838,142 | B2 * | 11/2010 | Scheucher | 429/99 |
| 8,256,552 | B2 * | 9/2012 | Okada | 180/68.5 |
| 8,376,076 | B2 * | 2/2013 | Kataoka et al. | 180/68.5 |
| 8,522,904 | B2 * | 9/2013 | Strock | 180/68.5 |
| 8,669,001 | B2 * | 3/2014 | Unterdorfer et al. | 429/120 |
| 2003/0095382 | A1 * | 5/2003 | Takedomi et al. | 361/688 |
| 2004/0238242 | A1 * | 12/2004 | Honda et al. | 180/65.1 |
| 2005/0064785 | A1 * | 3/2005 | Lee | 446/454 |
| 2005/0155802 | A1 * | 7/2005 | Hirano | 180/65.1 |
| 2006/0289208 | A1 * | 12/2006 | Katsuhiro et al. | 180/65.2 |
| 2007/0284167 | A1 * | 12/2007 | Watanabe et al. | 180/68.5 |
| 2008/0314662 | A1 * | 12/2008 | Bogelein et al. | 180/68.5 |
| 2008/0318119 | A1 * | 12/2008 | Watanabe et al. | 429/99 |
| 2009/0050387 | A1 * | 2/2009 | Yustick et al. | 180/68.5 |
| 2010/0000816 | A1 * | 1/2010 | Okada | 180/68.5 |
| 2010/0136425 | A1 * | 6/2010 | Gau et al. | 429/187 |
| 2011/0240391 | A1 * | 10/2011 | Bonneville | 180/220 |
| 2012/0160582 | A1 * | 6/2012 | Strock | 180/68.5 |
| 2012/0164500 | A1 * | 6/2012 | Loo et al. | 429/82 |
| 2012/0251863 | A1 * | 10/2012 | Berger et al. | 429/99 |
| 2013/0164577 | A1 * | 6/2013 | Insana et al. | 429/72 |
| 2013/0207460 | A1 * | 8/2013 | Kawatani et al. | 307/10.1 |
| 2013/0264134 | A1 * | 10/2013 | Matsuda | 180/68.1 |
| 2014/0328659 | A1 * | 11/2014 | Marji | 414/540 |
| 2014/0338995 | A1 * | 11/2014 | McLaughlin et al. | 180/68.5 |
| 2014/0339008 | A1 * | 11/2014 | Matsuda | 180/220 |
| 2014/0356661 | A1 * | 12/2014 | Yang | 429/71 |
| 2014/0356684 | A1 * | 12/2014 | Lim | 429/120 |
| 2014/0367183 | A1 * | 12/2014 | Matsuda | 180/220 |

FOREIGN PATENT DOCUMENTS

| | | |
|---|---|---|
| JP | 2005289236 A | 10/2005 |
| JP | 2010083371 A | 4/2010 |
| JP | 2010100124 A | 5/2010 |
| JP | 2010228660 A | 10/2010 |

OTHER PUBLICATIONS

State Intellectual Property Office of the People's Republic of China, Office Action Issued in Chinese Patent Application No. 201180074317.4, Sep. 1, 2015, 8 pages. (Submitted with Translation of Search Report).

* cited by examiner

STRADDLE ELECTRIC VEHICLE

TECHNICAL FIELD

The present invention relates to a straddle electric vehicle such as an electric motorcycle, which activates an electric motor by electric power supplied from batteries to generate driving power for moving the straddle electric vehicle.

BACKGROUND ART

In recent years, for example, for the purpose of environmental conservation, an electric motorcycle including as a driving power source an electric motor which is activated by electric energy stored in a battery has been developed (see, e.g., Patent Literature 1). Patent Literature 1 discloses a battery case including a casing which opens at one side and a lid member for closing an opening of the casing.

CITATION LIST

Patent Literature

Patent Literature 1: Japanese Laid-Open Patent Application Publication No. 2003-267283

SUMMARY OF INVENTION

Technical Problem

To allow the case to be easily incorporated into the straddle electric vehicle, the size of the case is preferably reduced to a smallest possible degree. On the other hand, to achieve continued driving of the straddle electric vehicle, the size of the battery is preferably increased to a greatest possible degree. If a gap between the inner wall of the case and the battery is merely reduced to achieve this, the battery cannot be easily removably mounted to the case. In a case where the battery of a great size is used, the case is required to bear the heavy weight of the battery. Under the circumstances, it is difficult to achieve both of a reduction of the size of the case to a smallest possible degree and a high stiffness of the case to bear the heavy weight of the battery.

Accordingly, an object of the present invention is to easily removably mount the battery of a greatest possible size to the case of a smallest possible size, while improving a stiffness of the case.

Solution to Problem

The present invention has been developed to achieve the above described object. According to the present invention, there is provided a straddle electric vehicle which rotates a drive wheel by driving power generated in an electric motor, comprising: a battery unit which is an electric power supply for the electric motor; and a battery case for storing the battery unit; wherein the battery case includes a pair of first case member and second case member which are joined together such that the first case member and the second case member are horizontally separable from each other, and a parting line of the first case member and the second case member extends above a bottom wall of the battery case; and wherein the first case member and the second case member include a first flange section and a second flange section, respectively, which define the parting line, and are separably joined to each other in a state in which the first flange section and the second flange section are engaged with each other.

In accordance with this configuration, the battery case includes the pair of case members which are joined together. Because of this, even when the battery unit is in close proximity to the inner wall of the battery case in a state in which the battery unit is stored in the battery case, the battery unit designed to have a largest possible size can be easily removably mounted to the battery case designed to have a smallest possible size. The battery case is dividable, for example, in the rightward or leftward direction, or in the forward or rearward direction. In this structure, the joint surfaces of the pair of case members extend vertically, and the parting line extends above the bottom wall of the battery case. By engaging the flange sections of the case members with each other, the case members are joined together. Therefore, the stiffness of a region of the battery case which is in the vicinity of the parting line is improved, and the bottom wall on which the weight of the battery unit tends to be exerted is allowed to have a high stiffness.

One of the first flange section and the second flange section may be exposed outward of the battery case farther than the other of the first flange section and the second flange section and may be oriented in a direction different from forward. The forward means a driving direction of the straddle electric vehicle moving ahead, and is forward from the perspective of the rider.

In accordance with this configuration, even when a gap is formed between the first flange section and the second flange section, the gap is oriented in a direction different from forward. This makes it possible to suitably prevent rain water or water splashed by wheels and moving rearward relative to the vehicle body from entering the battery case.

The straddle electric vehicle may comprise a battery fastening section for fastening the battery unit to the battery case; and the battery fastening section may be placed in an inner space of the battery case.

In accordance with this configuration, it is not necessary to form a through-hole in the battery case, for fastening the battery unit to the battery case. This makes it possible to suitably prevent rain water or water splashed by the wheels from entering the battery case.

The straddle electric vehicle may comprise a case joining section for joining the first case member to the second case member; and the case joining section may be provided on an outer surface of the battery case.

In accordance with this configuration, it is not necessary to form a through-hole for joining the pair of case members together, in a wall surface defining the inner space of the battery case. This makes it possible to suitably prevent rain water or water splashed by the wheels from entering the battery case.

The first case member and the second case member may be joined together such that the first case member and the second case member are separable from each other in a forward or rearward direction, the first case member may be placed forward relative to the second case member, the first flange section may include an outward protruding portion which protrudes outward of the case farther than the remaining portion of the battery case and a rearward protruding portion extending rearward from the outward protruding portion; and wherein the rearward protruding portion may be located outward of the case relative to the second flange section and may be oriented rearward.

In accordance with this configuration, even when a gap is formed between the first flange section and the second flange section, the gap is oriented rearward. This makes it possible to suitably prevent rain water or water splashed by the wheels and moving rearward relative to the vehicle body from entering the battery case.

The straddle electric vehicle may comprise an inside electric component stored in the battery case; an outside electric component disposed outside of the battery case; and an electric wire electrically connecting the battery unit or the inside electric component to the outside electric component; and the electric wire may extend from a rear surface of the battery case to the outside electric component.

In accordance with this configuration, even when a gap is formed between the electric wire and the battery case, the gap is oriented rearward. This makes it possible to suitably prevent rain water or water splashed by the wheels and moving rearward relative to the vehicle body from entering the battery case.

The battery case may have an upper lid which is removably attached on an upper portion thereof; and the inside electric component may be placed in an upper portion in an interior of the battery case.

In accordance with this configuration, maintenance of the inside electric component can be easily carried out. Even when water enters the battery case, it becomes possible to suitably prevent the inside electric component from being immersed in the water, because the inside electric component is located at an upper side that is distant from the lower portion of the case.

The straddle electric vehicle may comprise a front wheel and a rear wheel which are placed such that the battery case is interposed between the front wheel and the rear wheel in a forward or rearward direction; and an exhaust fan for exhausting air from an interior of the battery case; and the exhaust fan may be placed at an upper portion of the battery case.

In accordance with this configuration, since the exhaust fan is placed on the upper portion of the battery case, a possibility that rain water enters the battery case through the fan can be reduced, as compared to a case where the exhaust fan is placed at a lower side.

Advantageous Effects of Invention

As should be appreciated from the foregoing description, in accordance with the present invention, the battery can be easily removably mounted to the case, while improving a stiffness of the battery case. The above and further objects and features of the invention will more fully be apparent from the following detailed description with accompanying drawings.

DESCRIPTION OF EMBODIMENTS

Hereinafter, embodiments of the present invention will be described with reference to the accompanying drawings. The stated directions are referenced from the perspective of a rider riding in an electric motorcycle which is an exemplary straddle electric vehicle. Throughout the drawings, the same or corresponding components are designated by the same reference symbols and will not be described in repetition in detail.

(Overall Construction of Electric Motorcycle)

Figure 1:
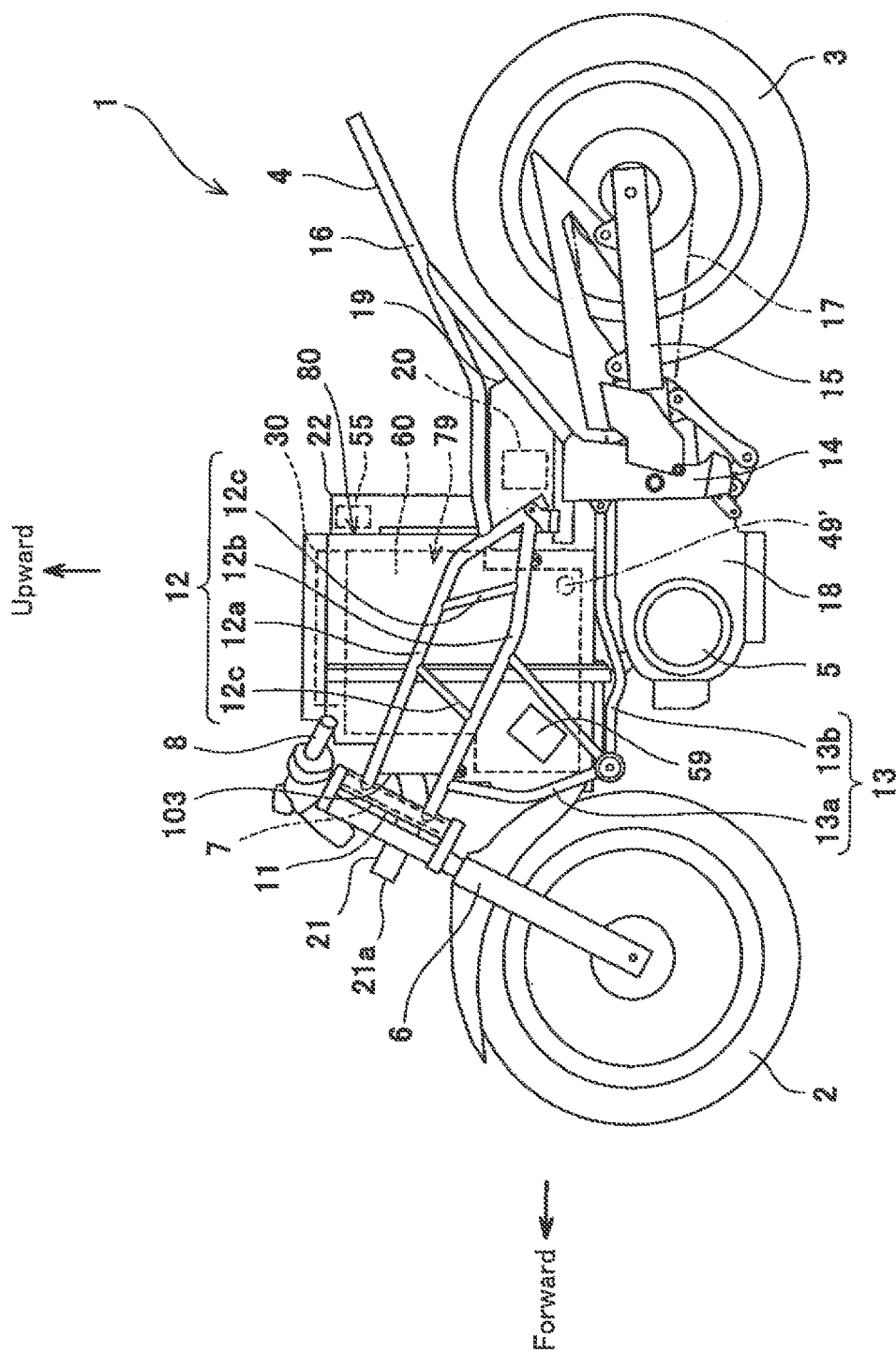
FIG. 1 is a left side view of an electric motorcycle which is an exemplary straddle electric vehicle according to an embodiment of the present invention.

FIG. 1 is a left side view of an electric motorcycle 1 which is an exemplary straddle electric vehicle according to an embodiment of the present invention. As shown in FIG. 1, the electric motorcycle 1 includes a front wheel 2 which is a driven wheel, a rear wheel 3 which is a drive wheel, a vehicle body frame 4 which is disposed between the front wheel 2 and the rear wheel 3, and an electric motor 5 mounted to the vehicle body frame 4. The electric motorcycle 1 is not equipped with an internal combustion engine and is configured to rotate the rear wheel 3 by driving power generated in the electric motor 5.

The front wheel 2 is rotatably mounted to the lower portion of a front fork 6 extending substantially vertically such that it is inclined with a certain caster angle. A steering shaft 7 is coupled to the upper portion of the front fork 6, and a bar-type handle 8 is attached to the upper portion of the steering shaft 7. A right grip of the handle 8 is an accelerator grip (not shown) which is manipulated by the rider to adjust the driving power generated in the electric motor 5.

The vehicle body frame 4 includes a head pipe 11, a pair of right and left and a pair of upper and lower main frames 12, a pair of right and left down frames 13, a pair of right and left pivot frames 14, a pair of right and left swing arms 15, and a seat frame 16. The head pipe 11 supports the steering shaft 7 such that the steering shaft 7 is rotatable.

The main frame 12 includes a pair of right and left upper main frame members 12a, a pair of right and left lower main frame members 12b, and truss frame members 12c coupling the upper main frame members 12a to the lower main frame members 12b. The upper main frame members 12a extend substantially in parallel with the lower main frame members 12b, respectively. The upper main frame members 12a and the lower main frame members 12b extend rearward from the head pipe 11 such that they are inclined slightly downward. Each of the upper main frame members 12a is bent substantially downward at its rear end portion and joined to the corresponding lower main frame member 12b to form a unitary member. Each of the truss frame members 12c couples the upper main frame member 12a to the lower main frame member 12b at a position which is forward relative to a point where the upper main frame member 12a and the lower main frame member 12b are joined together. This structure can improve a stiffness of the overall main frames 12.

Each of the down frames 13 includes a vertical frame member 13a extending substantially downward when viewed from the head pipe 11, and a lower frame member 13b extending substantially horizontally and rearward from the lower end of the vertical frame member 13a. Each of the pivot frames 14 is coupled to the rear end portion of the main frame 12 and the rear end portion of the lower frame member 13b. The swing arms 15 extend substantially in a forward or rearward direction. Each of the swing arms 15 is pivotally coupled at its front end portion to the pivot frame 14, and supports the rear wheel 3 by its rear end portion such that the rear wheel 3 is rotatable. The seat frame 16 extends rearward such that it is inclined slightly upward, from the rear end portions of the upper main frame members 12a and the upper end portions of the pivot frames 14. The seat frame 16 supports a seat (not shown) on which the rider and a passenger is seated in the forward or rearward direction.

The electric motor 5 is placed in a region which is below the down frames 13 and forward relative to the pivot frames 14. The driving power generated in the electric motor 5 is transmitted to the rear wheel 3 via a driving power transmission mechanism 17. The electric motor 5 is stored into a motor case 18. The motor case 18 contains a transmission 17a (see FIG. 2) constituting the driving power transmission mechanism 17, together with the electric motor 5 and is suspended from the down frames 12 and the pivot frames 14. It should be noted that the transmission 17a (see FIG. 2) may be a multistage transmission or gearless transmission, and may be manual or automatic transmission.

The electric motorcycle 1 incorporates an inverter case 19 and a battery case 80. The inverter case 19 contains electric components including the inverter 20, while the battery case 80 contains electric components including a battery unit 60. The inverter case 19 is placed in a space of a substantially-inverted-triangle shape when viewed from a side, which is surrounded by the main frame 12, the pivot frame 14 and the seat frame 16, and positioned immediately rearward relative to the lower rear end portion of the battery case 80.

The battery case 80 is placed in a space which is between the pair of right and left main frames 12, above the lower frame members 13b and forward relative to the pivot frames 14. The battery case 80 is sandwiched between the front wheel 2 and the rear wheel 3 in the forward or rearward direction. The battery case 80 is placed between the pair of right and left main frames 12 such that it does not overlap with the main frames 12 when viewed from above. Therefore, by inserting the battery case 80 into a space between the main frames 12, from above or from below, the battery case 80 can be mounted to the vehicle body frame 4. As will be described in detail later, the battery case 80 is supported by the upper surfaces of the lower frame members 13b, and the down frames 13 serve as support frame members for supporting the battery case 80 and the battery unit 60. Also, the battery case 80 is fastened to the right and left main frames 12. This makes it possible to effectively prevent an excess load from being applied to the down frames 13, and support the battery case 80 with a heavy weight by the entire vehicle body frame 4.

As will be described later in detail, the front surface of the battery case 80 is offset rearward in a stepwise manner, in an upward direction. This makes it possible to prevent interference between the handle 8 and a portion of the battery case 80 which portion is located above the main frames 12. In addition, a portion of the battery case 80 which portion is located below the main frames 12, is increased in size in a forward direction to fill a dead space which is behind the front wheel 2, which contributes to an increase in a battery capacity. In the present embodiment, each of the vertical frame members 13a is joined to the front end portion of the lower main frame member 12b. Since the down frames 13 are not directly joined to the head pipe 11, it becomes easy to ensure the space in which the battery case 80 is placed, even if the caster angle is set smaller. Also, the lower portion of the rear surface of the battery case 80 is offset forward relative to the upper portion of the rear surface. This makes it possible to prevent interference between the rear portion of the battery case 80 and the rear end portions of the upper and lower main frame members 12a, 12b. In addition, a portion of the battery case 80 which portion is located above the main frames 12, is increased in size in a rearward direction, which contributes to an increase in the battery capacity.

To steer the electric motorcycle 1, the rider is seated over the seat (not shown), stretches the rider's hands up to the handle 8, and stretches the rider's feet to the lower end portions of the pivot frames 14. At this time, the rider grips the rear upper portion of the battery case 80 located forward relative to the seat, with knees. As will be described in detail later, the battery case 80 has a shape in which a dimension of its rear upper portion in the rightward or leftward direction is smaller than a dimension of its rear lower portion in the rightward or leftward direction. This allows the rider to easily grip the battery case 80 with the knees. In addition, the rear lower portion of the battery case 80, which is not reached by the rider's knees, can be increased in size in the rightward or leftward direction, which contributes to an increase in the battery capacity.

An air-intake duct 21 is coupled to the front surface of the battery case 80, while an air discharge duct 22 is coupled to the rear surface of the battery case 80. The air-intake duct 21 extends forward from the front surface of the battery case 80. The air discharge duct 22 extends downward from the upper portion of the rear surface of the battery case 80 and is coupled to the upper surface of the inverter case 19. By providing these ducts 21, 22, ram air from forward is taken into the air-intake cut 21, and sent to the interior of the battery case 80 via the air-intake duct 21. Also, the air is discharged from the interior of the battery case 80 to the air discharge duct 22, and sent to the interior of the inverter case 19 via the air discharge duct 22. In this way, the electric components stored in the battery case 80 and the electric components stored in the inverter case 19 can be cooled by the air. As a result, reliability of the operation of these electric components can be maintained.

An air-intake port 21a which is the upstream end of the air-intake duct 21 protrudes forward farther than the axis of the front fork 6 when viewed from a side. This makes it possible to prevent a situation in which rain water and mud splashed up by the wheels 2, 3 enters the air-intake duct 21 through the air-intake port 21a. The downstream end of the air-intake duct 21 is connected to a portion of the front surface of the battery case 80, which portion is in the vicinity of the head pipe 11 in the forward or rearward direction, and overlaps with the main frame 12 when viewed from a side. Because of this, the length of the air-intake duct 21 can be reduced significantly, in the layout in which the air-intake port 21a is located forward relative to the front fork 6. This can significantly reduce a passage resistance in the air-intake duct 21, which allows the ram air to be sent smoothly to the interior of the battery case 80. Since the exhaust fan 22 is placed at the upper portion of the battery case 80, it becomes possible to reduce a possibility that the rain water or the like enters the interior of the battery case 80 via the exhaust fan 22.

(Electric Configuration)

Figure 2:
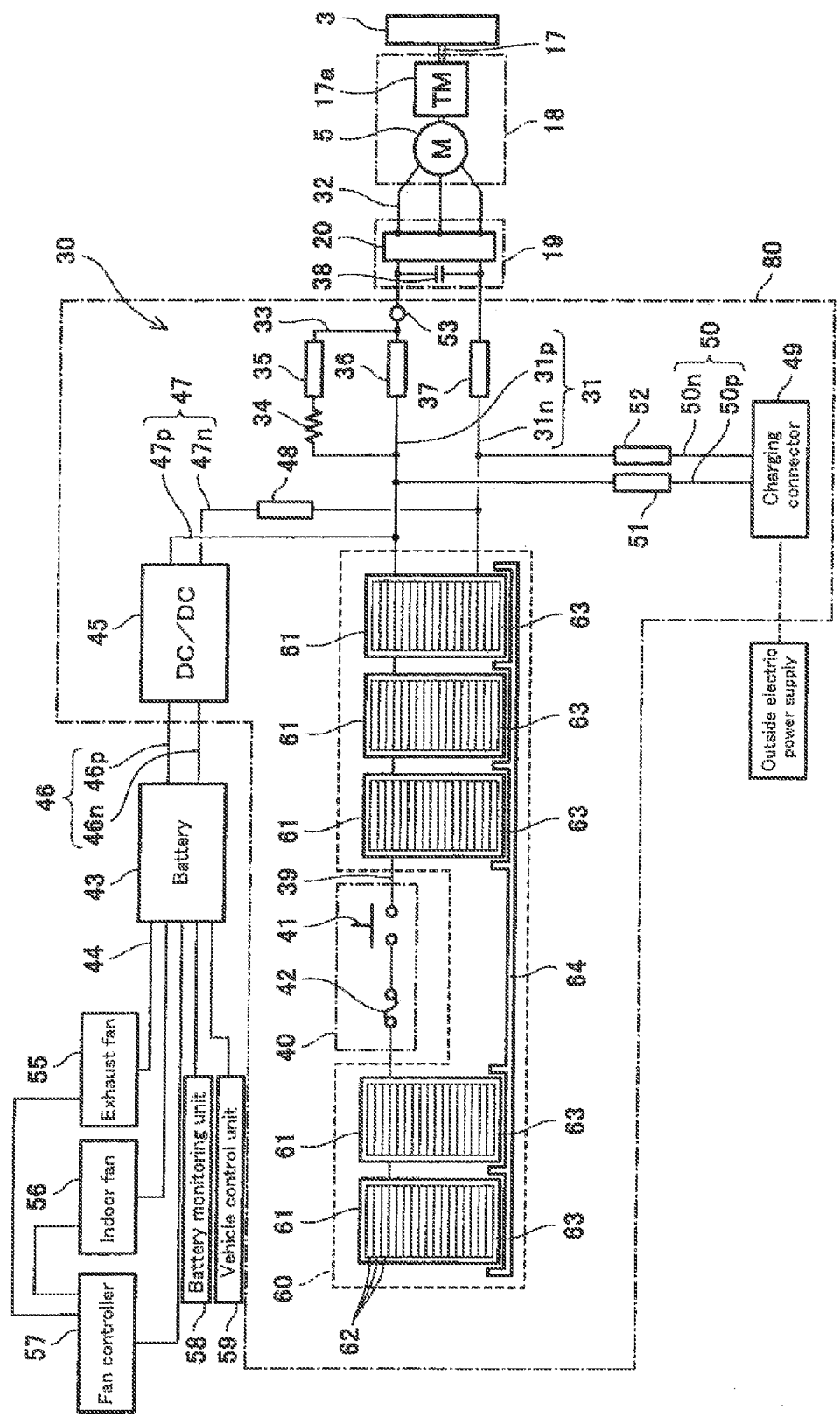
FIG. 2 is a block diagram showing electric components and electric wires which are connected to a battery unit and an inverter of FIG. 1.

FIG. 2 is a block diagram showing the electric components and electric wires which are connected to the battery unit 60 and the inverter 20 of FIG. 1. As shown in FIG. 2, the battery unit 60 includes a plurality of battery modules 61 and a battery frame 64. Each of the battery modules 61 includes a plurality of battery cells 62 and a module casing 63 of a rectangular parallelepiped shape, for storing the plurality of battery cells 62. Each of the battery cells 62 is a secondary battery which is capable of storing DC power, and is, for example, a lithium ion battery or nickel metal hydride. The plurality of battery cells 62 are aligned and electrically connected to each other in the interior of the module casing 63. The plurality of battery modules 61 are densely arranged in the interior of the battery case 80 and electrically connected in series, in a state in which they are connected to and fastened to the battery frame 64. Although the plurality of battery modules 61 are illustrated as arranged laterally on the battery frame 64 of a tray shape in FIG. 2, specific layout of the battery modules 61 and specific structure of the battery frame 64 are different from those shown in FIG. 2, as will be described later (see FIGS. 3 and 6).

As should be understood from above, the battery unit 60 is configured such that many battery cells 62 are connected in series in an electric view point, and as a result serves as the secondary battery of high-voltage DC power (e.g., 200 to 300V). It should be noted that all of the battery cells 62 constituting the battery unit 60 need not be connected in series. Alternatively, all of the battery cells 62 may be divided into a plurality of groups, the plurality of battery cells in each group may be connected in series, and the plurality of groups may be connected in parallel.

The battery unit 60 is electrically and mechanically connected to the inverter 20 via a high-voltage electric wire 31 composed of a power wire 31p and a ground wire 31n. The inverter 20 converts high-voltage DC power supplied from the battery unit 60 into three-phase AC power. Then, the AC power is supplied to the electric motor 5 via AC wires 32. The electric motor 5 is activated by the AC power supplied from the inverter 20 and generates the driving power corresponding to electric characteristics such as a current.

The power wire 31p of the high-voltage electric wire 31 is connected in parallel with a bypass wire 33. A current steering resistor 34 and an anti-rush-current relay 35 are provided in series on the bypass wire 33. An inverter P-side relay 36 is provided on the power wire 31p of the high-voltage electric wire 31, at a position between two connection points at which the power wire 31p is connected to the bypass wire 33. An inverter N-side relay 37 is provided on the ground wire 31n of the high-voltage electric wire 31. The inverter case 19 contains a smoothing capacitor 38 provided between the power wire 31p and the ground wire 31n. When the vehicle is started, it becomes possible to prevent a rush current with an excessively great magnitude from flowing through the inverter 20 by suitably selecting ON/OFF of the relays 35 to 37, even under a state in which charges are not accumulated in the smoothing capacitor 38. Current meter(s) 53 is/are attached onto the power wire 31p, the ground wire 31n and/or the bypass wire 33 (in FIG. 2, a case where the current meter 53 is attached only on the power wire 31p is exemplarily shown).

A service plug 40 is provided on a wire 39 connecting the battery modules 61 to each other. The service plug 40 includes a plug 41 for switching between continuity (conduction) and cut-off of the wire 39 and a fuse 42 for cutting off the wire 39 if a current with an excessively great magnitude flows therethrough. A maintenance operator operates the plug 41 manually to enable switching between a power supply state in which the wire 39 is placed in a conductive state and the electric power can be supplied from the battery unit 60 to the electric motor 5 and a cut-off state in which the wire 39 is placed in a cut-off state and the electric power supplied from the battery unit 60 to the electric motor 5 is cut off.

The electric motor 1 includes a low-voltage battery 43 which is a secondary battery of a low-voltage DC power (e.g., 12V), separately from the battery unit 60 which is a power supply for the electric motor 5. The low-voltage battery 43 is connected to a power load which is other than the electric motor 5, via a low-voltage electric wire 44. The power loads which use the low-voltage battery 43 as the power supply include, for example, the exhaust fan 55 and an indoor fan 56 for generating an air flow in the interior of the battery case 80, a fan controller 57 for controlling the operation of the exhaust fan 55 and the operation of the indoor fan 56, a battery monitoring unit 58 for monitoring a state of charge (SOC) of the battery unit 60 and a vehicle control unit 59 for controlling the operation of the electric motor 5. In addition to these, the power loads include a lighting device such as a head light, a tail lamp and a direction indicator, gauges or display device such as a speed meter.

The low-voltage battery 43 is connected to a DC/DC converter 45 via a first converter wire 46 composed of a power wire 46p and a ground wire 46n. The DC/DC converter 45 is connected to the high-voltage electric wire 31 via a second converter wire 47 composed of a power wire 47p and a ground wire 47n. A DC/DC converter relay 48 is provided on the power wire 47p or the ground wire 47n (in FIG. 2, a case where the DC/DC converter relay 48 is provided on the ground wire 47n is exemplarily shown).

The high-voltage electric wire 31 is connected to a charging connector 49 via a charging wire 50 including a power wire 50p and a ground wire 50n. A charging P-side relay 51 is provided on the power wire 50p, while a charging N-side relay 52 is provided on the ground wire 50n. The charging connector 49 is connectable to an outside electric power supply. When the charging connector 49 is connected to the outside electric power supply, the electric power is supplied from the outside electric power supply to the battery unit 60 via the charging wire 50 and the high-voltage electric wire 31, thereby charging the battery unit 60. Also, the low-voltage battery 43 can be charged with the electric power supplied from the outside electric power supply. Or, during deceleration of the vehicle, the electric motor 5 operates as a generator. In this case, the inverter 20 converts the AC power generated in the electric motor 5 into the DC power, which charges the battery unit 60 and the low-voltage battery 43. Also, the DC/DC converter 45 converts the electric potential of the DC power stored in the battery unit 60, and the DC power with the converted electric potential can charge the low-voltage battery 43.

As described above, the plurality of electric components and the plurality of electric wires are connected to the battery unit 60 and the inverter 20. Among the plurality of electric components, the resistor 34, the relays 35 to 37, 48, 51, 52, the service plug 40, the DC/DC converter 45, and the current meter 53 are stored in the battery case 80. The charging connector 49 may be stored into the battery case 80. In addition to the components shown in FIG. 2, a ground leakage detector 54 (see FIG. 3) may be stored into the battery case 80. In description below, in some cases, among the plurality of electric components, the electric components stored into the battery case 80 will be collectively referred to as "inside electric components 30", while the electric components (e.g., smoothing capacitor 38, the low-voltage battery 43, etc.) placed outside of the battery case 80, will be collectively referred to as "outside electric components". Among the plurality of electric wires, a portion of the high-voltage electric wire 31, the entire bypass wire 33, a portion of the first converter wire 46, the entire second converter wire 47, and the entire charging wire 50, are stored into the battery case 80.

(Battery Unit)

Figure 3:
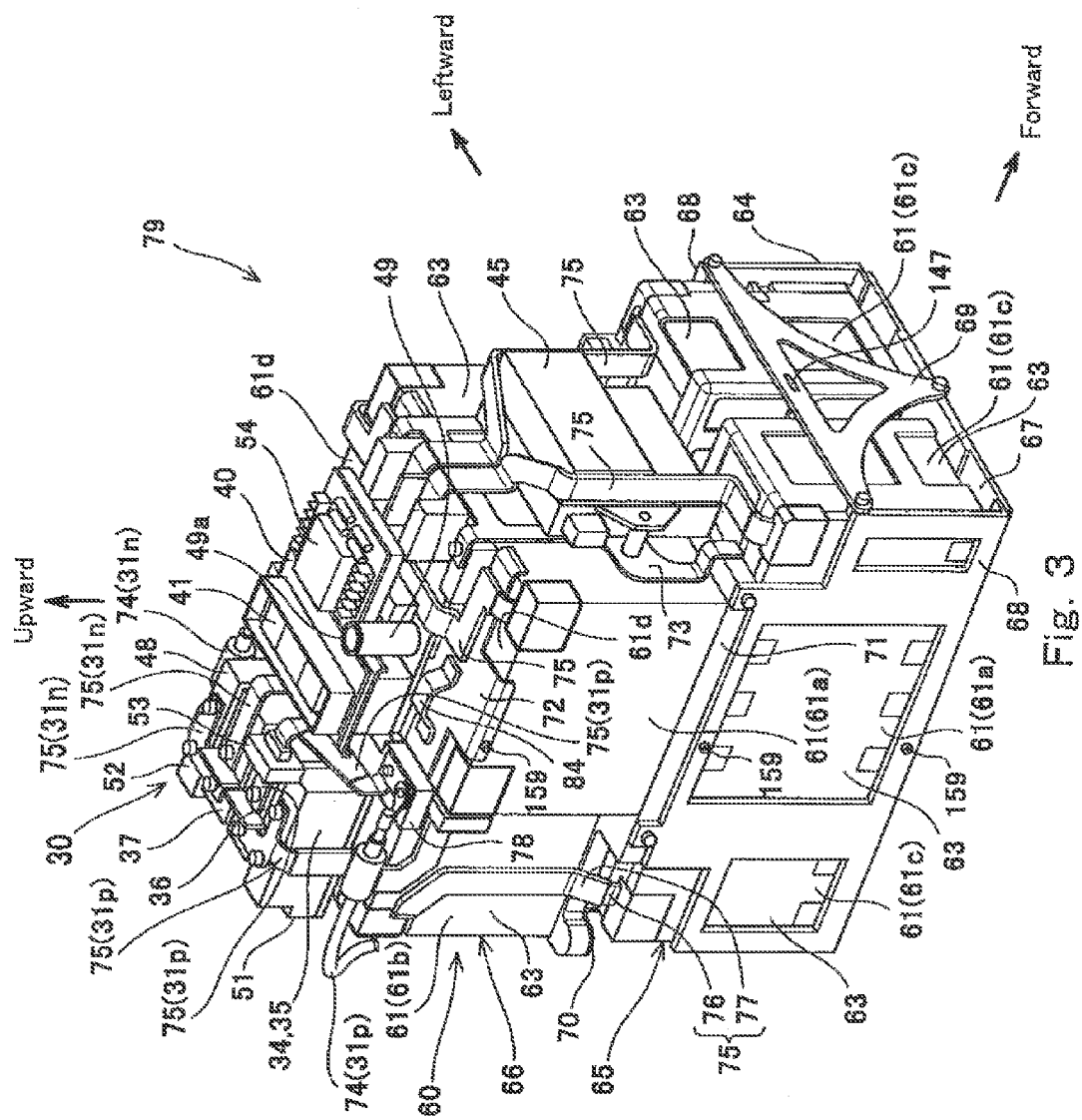
FIG. 3 is a perspective view showing a state in which the electric components and the electric wires are mounted to the battery unit of FIG. 1, when viewed from forward, rightward and above.

FIG. 3 is a perspective view showing a state in which the inside electric components 30 and the electric wires are mounted to the battery unit 60 of FIG. 2, when viewed from forward, rightward and above. As shown in FIG. 3, each of the battery modules 61 includes the module casing 63 of a rectangular parallelepiped shape, and the battery modules 61 are densely arranged such that its height direction substantially conforms to the vertical direction, its widthwise direction substantially conforms to the right and leftward direction, and its lengthwise direction substantially conforms to the forward or rearward direction. When the plurality of battery modules 61 thus densely arranged are viewed in a macroscopic manner, they include a lower section 65 of a rectangular parallelepiped shape, and an upper section 66 stacked on the lower section 65. The front surface of the lower section 65 is offset rearward relative to the front surface of the upper section 66. The rear surface of the upper section 66 is offset forward relative to the rear surface of the lower section 65. The left side surface and right side surface of the lower section 65 are substantially coplanar with the left side surface and right side surface of the upper section 66 at its front portion, while the left side surface and right side surface of the lower section 65 are offset at its rear portion toward the center in the rightward or leftward direction, relative to the left side surface and right side surface of the upper section 66. Because of this structure, the upper surface of the upper section 66 has a substantially-T shape when viewed from above.

The battery frame 64 includes a bottom plate portion 67 supporting the bottom surface of the lower section 65, a pair of lower side cover portions 68 covering the left side surface and right side surface of the lower section 65, a lower front cover portion 69 covering the front surface of the lower section 65, a lower rear cover portion 70 covering the rear surface of the lower section 65, an intermediate plate portion 71 covering the upper surface of the lower section 65 and supporting the bottom surface of the upper section 66, a top plate portion 72 provided on the upper surface of the upper section 66, and a front bracket 63 connecting the front edge of the top plate portion 72 to the front edge of the intermediate plate portion 71.

The battery frame 64 is formed by joining together metal plate members which are press-formed, by means of bolts. Each of the lower side cover portions 68 is fastened at its lower end portion to the bottom plate portion 67, and at its upper end portion to the intermediate plate portion 71. The lower front cover portion 69 is fastened at its upper end portion to the pair of lower side cover portions 68 and at its lower end portion to the bottom plate portion 67. The lower rear cover portion 70 is fastened at its upper end portion to the intermediate plate portion 71 and at its lower end portion to the bottom plate portion 67. The plurality of battery modules 61 are joined to the battery frame 64 assembled as described above by means of bolts, etc., thus constructing the battery unit 60.

By joining the battery modules 61 to the battery frame 64, the battery modules 61 are unitarily coupled together. The battery frame 64 has a frame shape conforming to the outer shape of the battery unit 60, and has a frame shape extending along the sides or surfaces of a cubic body, in the present embodiment. The battery frame 64 has a stiffness sufficient to bear the weight of the battery modules 61 by its bottom surface, in a state in which all of the battery modules 61 are joined to the battery frame 64. In addition, the battery frame 64 is able to support the battery modules 61 even in a state in which it is suspended by a suspending member attached on its upper surface.

In accordance with the battery unit 60 configured as described above, since the plurality of battery modules 61 are densely arranged such that the lower section 65 and the upper section 66 are stacked together in the vertical direction, it becomes possible to suppress an increase in the dimension of the battery unit 60 in the rightward or leftward direction while increasing the volume of the battery unit 60. This allows the battery unit 60 to be suitably incorporated into the electric motorcycle including the vehicle body which is relatively small in the rightward or leftward direction. The battery modules 61 are connected to and fastened to the battery frame 64. For this reason, the plurality of battery modules 61 restrict each other via the battery frame 64. Therefore, even if the battery unit 60 is subjected to loads such as twisting, bending, compression, tension and shear, during driving, it becomes possible to suppress the battery modules 61 from being displaced individually. As a result, a weight balance of the vehicle can be stabilized during driving.

In the present embodiment, to implement the above described shape of the battery unit 60, the battery unit 60 includes two large battery modules 61*a*, one medium battery module 61*b*, and four small battery modules 61*c*. The large battery modules 61*a*, the medium battery module 61*b*, and the small battery modules 61*c* are different in volume from each other. The two large battery modules 61*a* are stacked together in the vertical direction in a state in which they are not deviated from each other in the forward or rearward direction or in the rightward or leftward direction.

The four small battery modules 61*c* are placed such that they sandwich the lower large battery module 61*a* in the forward or rearward direction. The two small batteries 61*c* at a front side are arranged in the rightward or leftward direction, while the two small batteries 61*c* at a rear side are also arranged in the rightward or leftward direction (in FIG. 3, only right side is shown). The large battery module 61*a* and the small battery modules 61*c* are equal in height. This allows the upper surfaces of the five battery modules 61 at a lower side to be substantially coplanar with each other and the bottom surfaces of the five battery modules 61 at a lower side to be substantially coplanar with each other. The width of the small battery modules 61*c* is slightly smaller than a half of the width of the large battery module 61*a*. This allows the left side surfaces of the five battery modules 61 at a lower side to be substantially coplanar with each other and the right side surfaces of the five battery modules 61 at a lower side to be substantially coplanar with each other. In this way, the five battery modules 61 constitute the above stated lower section 65.

One medium battery module 61*b* is placed rearward relative to the upper large battery module 61*a*. In other words, one medium battery module 61*b* is placed on the two small battery modules 61*c* at a rear side. The medium battery module 61*b* and the large battery module 61*a* are equal in height. This allows the upper surfaces of the two battery modules 61 at an upper side to be substantially coplanar with each other and the bottom surfaces of the two battery modules 61 at an upper side to be substantially coplanar with each other. The width of the medium battery module 61*b* is smaller than the width of the large battery module 61*a*. The widthwise center axis of the medium battery module 61*b* substantially conforms to the widthwise center axis of the large battery module 61*a*. This allows the left side surface and right side surface of the medium battery module 61b to be offset toward the center in the rightward or leftward direction, relative to the left side surface and right side surface of the large battery module 61a. The upper surface of the medium battery module 61b and the upper surface of the large battery module 61a have a substantially-T shape as a whole when viewed from above. The lengthwise length of the medium battery module 61b is greater than the lengthwise length of the small battery module 61c. This allows the rear surface of the medium battery module 61b to be offset rearward relative to the rear surfaces of the two small battery modules 61c at a rear side. No battery module is placed forward relative to the large battery module 61a at an upper side. This allows the front surface of the large battery module 61a at an upper side to be offset rearward relative to the front surfaces of the two small battery modules 61c at a front side. In this way, the two battery modules 61 constitute the above stated upper section 66.

It should be noted that the above described configuration is merely exemplary, and the sizes of the battery modules 61 and the number of the battery modules 61 can be suitably changed.

(Electric Components and Electric Wires Inside of Battery Case)

Figure 4:
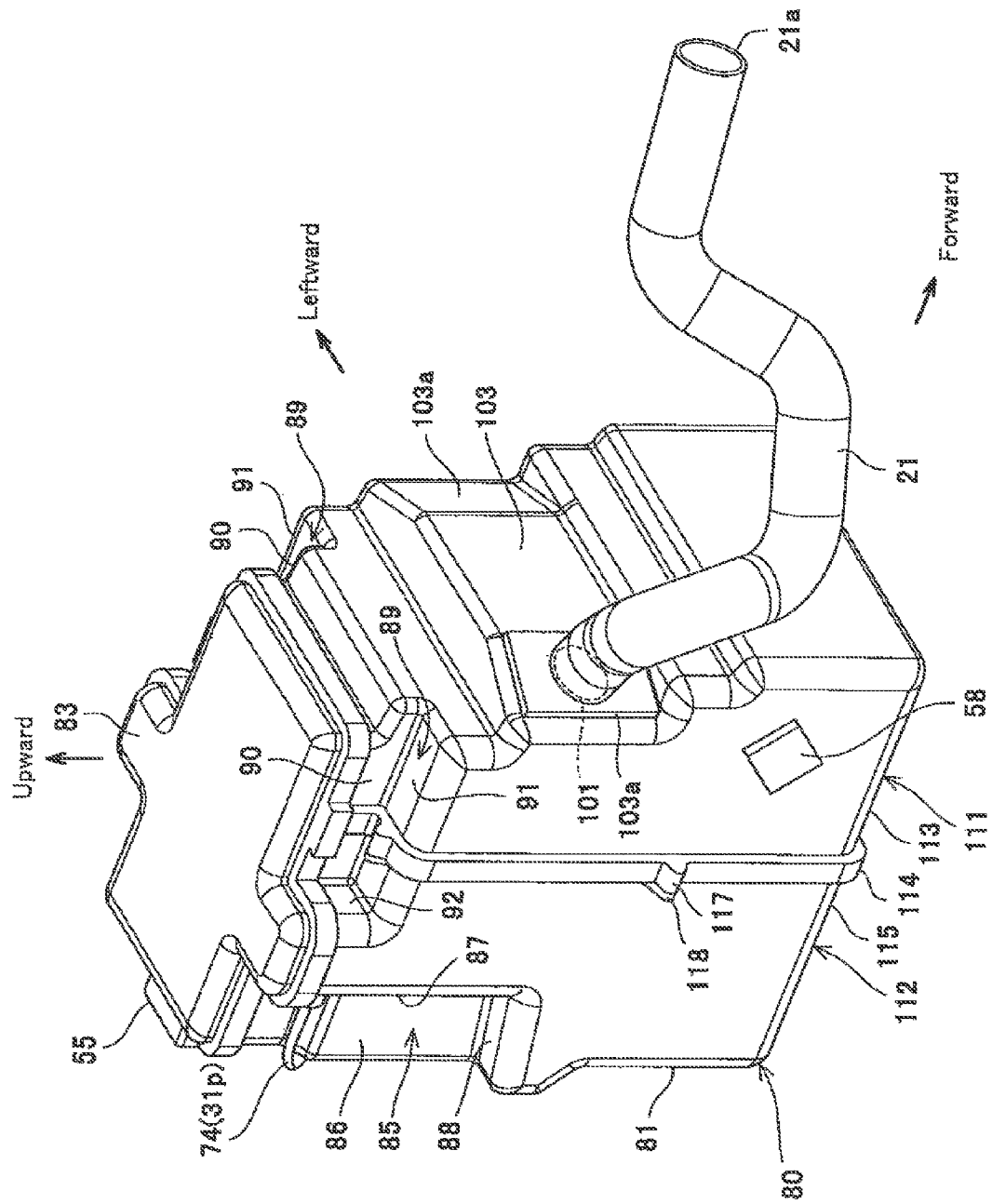
FIG. 4 is a perspective view showing a battery case of FIG. 1, when viewed from forward, rightward and above.
Figure 5:
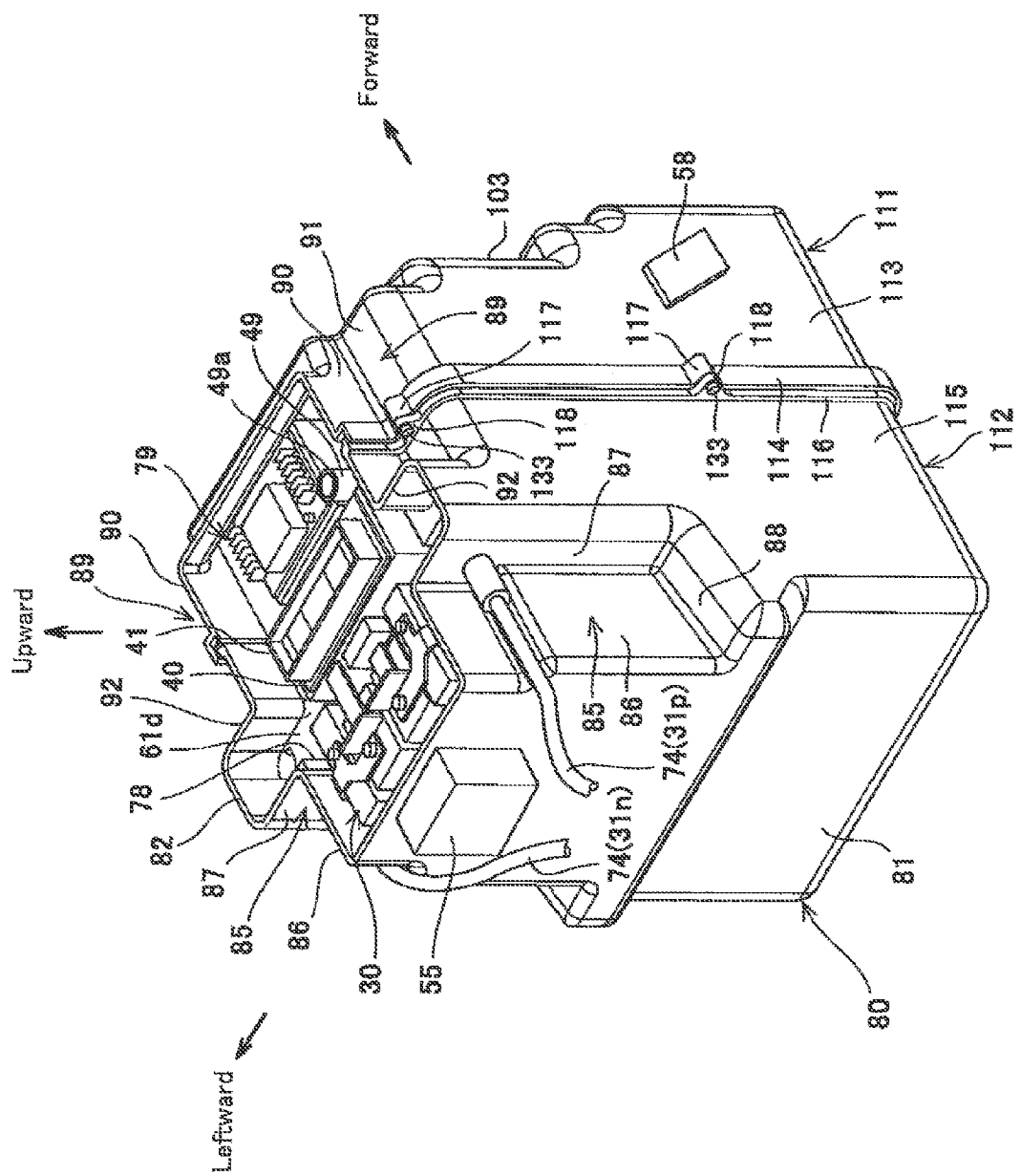
FIG. 5 is a perspective view showing a state in which an upper lid is detached from the battery case of FIG. 4, when viewed from rearward, rightward and above.
Figure 6:
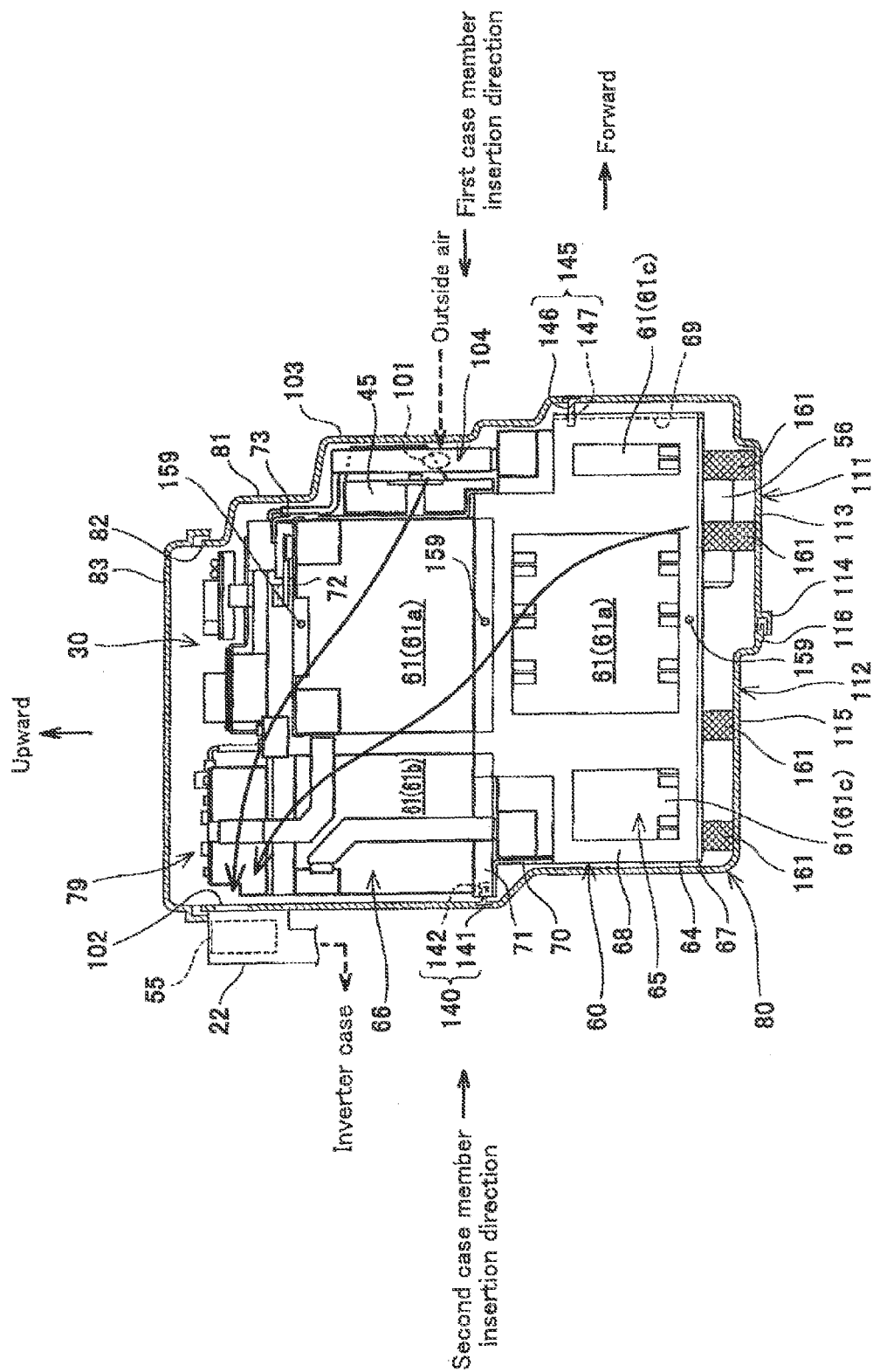
FIG. 6 is a cross-sectional view of the battery case of FIG. 4, when viewed from rightward.

The battery unit 60 is assembled and integrated with the inside electric components 30 and the plurality of electric wires, which are described above, and stored into the battery case 80 (see FIGS. 4 to 6). Since the battery unit 60 has a high stiffness because of the battery frame 64, it can continue to stably support the inside electric components 30 and the electric wires, even when the battery unit 60 is subjected to a load during driving. In description below, an assembly of the battery unit 60, the inside electric components 30 and the electric wires, will be referred to as "battery assembly 79".

Among the inside electric components 30, the DC/DC converter 45 is mounted to the front surface of the upper section 66. In front of the front surface of the upper section 66, there is formed a space which can be formed by offsetting the front surface of the lower section 65 forward relative to the upper section 66. The DC/DC converter 45 is placed in this space. The DC/DC converter 45 is in a lowest possible position within the space. The bottom portion of the DC/DC converter 45 is in close proximity to the front edge of the intermediate plate portion 71 of the battery frame 64 and the upper surface of the upper section 66. This makes it possible to avoid that a considerable recessed portion which recedes rearward is formed between the front surface of the DC/DC converter 45 and the front surface of the lower section 65, in the vertical direction. Thus, the front surface of the battery assembly 79 is offset rearward in a stepwise manner from a lower side toward an upper side. Since the dimension of the DC/DC converter 45 in the forward or rearward direction is smaller than the lengthwise length of the small battery module 61c, the front surface of the DC/DC converter 45 is placed rearward relative to the front surface of the lower section 65.

Among the inside electric components 30, the resistor 34, the relays 35 to 37, 48, 51, 52, the service plug 40, the charging connector 49, the current meter 53, and the ground leakage detector 54 are mounted to the upper surface of the battery unit 60 (i.e., the upper surface of the upper section 66 and/or the upper surface of the top plate portion 72). These inside electric components 30, other than the DC/DC converter 45, are densely arranged in a rectangular region when viewed from above, which may be virtually defined on the upper surface of the battery unit 60. This rectangular region in the forward or rearward direction extends over substantially the entire upper surface of the battery unit 60 in the forward or rearward direction. This rectangular region in the rightward or leftward direction extends over substantially the entire width of the rear portion of the upper section 66 (i.e., medium battery module 61b). In other words, the upper surface of the front portion of the upper section 66 (i.e., large battery module 61a) constitutes a pair of non-mounting surfaces 61d in which the inside electric components 30 are not placed, in a portion protruding in the rightward or leftward direction, when viewed from the rear portion of the upper section 66.

The relays 35 to 37, 48, 51, 52, are densely arranged in the rear portion of the rectangular region. The current meter 53 is adjacent to the inverter P-side relay 36. The ground leakage detector 54 is placed in the front portion of the rectangular region. The service plug 40 and the charging connector 49 are placed adjacently to the ground leakage detector 54 in the rightward or leftward direction or between the relay group and the ground leakage detector 54 in the forward or rearward direction.

Among the relays 35 to 37, 48, 51, 52, the inverter P-side relay 36 and the inverter N-side relay 37 are relatively large, while the remaining four relays 35, 48, 51, 52 are relatively small. In view of this, the inverter P-side relay 36 and the inverter N-side relay 37 are arranged side by side in the center portion in the rightward or leftward direction, in the rear portion of the rectangular region. The remaining four relays 35, 48, 51, 52 are arranged such that the two relays 36, 37 are sandwiched between the four relays 35, 48, 51, 52 in the rightward or leftward direction. As will be described later, the exhaust fan 55 (see FIG. 5) is attached to the rear upper portion of the battery case 80 (see FIG. 5). The width of the exhaust fan 55 is smaller than the width of the relays 35 to 37, 48, 51, 52. The relays 35 to 37, 48, 51, 52 are placed to face the exhaust fan 55 in the forward or rearward direction. In this structure, the relays 35 to 37, 48, 51, 52 can be suitably cooled by the air.

The electric wires stored in the battery case 80 are wire harnesses 74 or bus bars 75. Each of the bus bars 75 includes a bent metal plate member 76 and an insulating cover 77 covering a portion between both ends of the metal plate member 76. The metal plate member 76 is placed to extend along the surface of the battery unit 60 and the surfaces of the inside electric components 30. A portion of the metal plate 76 which is not covered with the insulating cover 77 serves as a contact which is electrically connected to a terminal of the battery module 61 or a terminal of the inside electric component 30.

The buss bars 75 are used for electric connection accomplished inside of the battery case 80, while the wire harnesses 74 are used for electric connection between the inside electric components 30 and the outside electric components. The electric connection accomplished inside of the battery case 80 includes connection between the battery modules 61, connection between the inside electric components 30, and connection between the battery modules 61 and the inside electric components 30. The high-voltage electric wire 31 (see FIG. 2) includes a portion used for the connection between the inside electric components 30 and a portion used for the connection between the inside electric components 30 and the outside electric components. Therefore, the uses of the wire harnesses 74 and the uses of the bus bars 75 are easily understood when an attention is paid to the power wire 31p and the ground wire 31n constituting the high-voltage electric wire 31.

Regarding the power wire 31p, the bus bar 75 is used in a portion connecting the P terminal of the large battery module 61a at an upper side to the inverter P-side relay 36. The bus bar 75 is also used in a portion connecting the inverter P-side relay 36 to the current meter 51. The bus bar 75 and the wire harness 74 are both used in a portion connecting the current meter 53 which is the inside electric component 30 to the smoothing capacitor 38 (see FIG. 2) or the inverter 20 (see FIG. 2) which is the outside electric component. The bus bar 75 extends from the current meter 53 and the wire harness 74 extends toward the outside electric component. A terminal block 78 is provided on the rear end portion of the non-mounting surface 61 at a right side. The bus bar 75 is electrically connected to the wire harness 74 at the terminal block 78. The same applies to the ground wire 31n. The bus bar 75 is used in a portion connecting the N terminal of the large battery module 61a at an upper side to the inverter N-side relay 37. The bus bar 75 and the wire harness 74 are both used in a portion connecting the inverter N-side relay 37 which is the inside electric component 30 to the smoothing capacitor 38 (see FIG. 2) or the inverter 20 (see FIG. 2) which is the outside electric component. The bus bar 75 extends from the inverter N-side relay 37 and the wire harness 74 extends toward the outside electric component. The bus bar 75 is electrically connected to the wire harness 74 at the terminal block 78 (see FIG. 5) provided on the rear end portion of the non-mounting surface 61d at a left side (see FIG. 5).

Two wire harnesses 74 used in the power wire 31p and the ground wire 31n extend rearward from the non-mounting surface 61d. These two wire harnesses 74 are apart outward in the rightward or leftward direction from the rear portion of the upper section 66. Also, these two wire harnesses 74 overlap with the upper surface of the rear portion of the lower section 65 (i.e., two small battery modules 61c at a rear side).

Many of the electric wires connected to the battery unit 60 are placed to extend along the surface of the battery unit 60 and the surfaces of the inside electric components 30. This makes it possible to compactly configure the structure in the vicinity of the inside electric components 30. The wire harness 74 used in the high-voltage electric wire 31 is also placed in an outward region of the rectangular region in the rightward or leftward direction and does not interfere with the inside electric components 30. If the metal plate member 76 is formed to have a great width, it can easily have a greater cross-sectional area than the wire harness 74, which makes it possible to reduce a need for a material which is expensive and has a great specific weight, such as silver and copper, although these have a high electric conductivity. For example, aluminum is suitably used as the metal plate member 76 to make the electric wire inexpensive and light.

The anti-rush-current relay 35, the inverter P-side relay 36 and the charging P-side relay 51 are connected in parallel to the power wire 31p. These relays 35, 36, 51 are placed in a rear right portion of the above stated rectangular region. The relay 35 is relatively large in size, while the relays 36, 51 are relatively small in size. The height of the relay 35 is different from the height of the relays 36, 51, but these three relays 35, 36, 51 are placed such that their upper surfaces are coplanar with each other. Thereby, by merely mounting the flat bus bar over the upper surfaces of these three relays 35, 36, 51, the above stated parallel connection is implemented. Since these three relays 35, 36, 51 are densely arranged, the flat bus bar can be reduced in size. The same applies to the inverter N-side relay 37, the charging N-side relay 52 and the DC/DC converter relay 48 which are densely arranged in a rear left portion of the rectangular region.

(Schematic Configuration of Battery Case)

FIG. 4 is a perspective view showing the battery case 80 of FIG. 1, when viewed from forward, rightward and above. FIG. 5 is a perspective view showing a state in which an upper lid 83 is detached from the battery case 80 of FIG. 4, when viewed from rearward, rightward and above. In FIGS. 4 and 5, the air discharge duct 22 is not shown.

As shown in FIGS. 4 and 5, the battery case 80 includes a case body 81 having an opening 82 at an upper portion thereof, and the upper lid 83 which is detachably attached to the case body 81 and covers the opening 82. With the upper lid 82 attached to the case body 81, a closed inner space of the battery case 80 is formed. The battery unit 60 is stored into the inner space of the battery case 80 in a state in which the battery unit 60 is mounted to the electric components and the electric wires. The upper lid 83 is placed so as to overlap with the electric components mounted to the upper surface of the battery unit 60, when viewed from above.

By detaching the upper lid 83 from the case body 81, the inside electric components 30 can be seen or accessed through the opening 82, from outside and above the battery case 80. Especially, the plug 41 of the service plug 40 and the charging connector 49 are placed so as to overlap with the upper lid 83, when viewed from above. Therefore, by opening the opening 82, the plug 41 and the charging connector 49 can be easily accessed.

By pulling out the plug 41 upward, the maintenance operator can perform switching from the conductive state to the cut-off state in which the electric power supplied from the battery unit 60 to the electric motor 5 (see FIG. 2) is cut off. By returning the pulled-out plug 41 to its initial position, the maintenance operator can switch the cut-off state to the power supply state in which the electric power can be supplied from the battery unit 60 to the electric motor 5 (see FIG. 2). The charging connector 49 has an outlet 49a into which a connector (not shown) of the outside electric power supply is inserted. The outlet 49a is oriented upward. By inserting the connector of the outside electric power supply into the outlet 49a through the opening 82 from outside and above, the rider can charge the battery unit 60. As should be appreciated from this, in accordance with the present embodiment, the manual operation and charging work of the service plug 40 can be carried out easily. The bus bars 75 are used in many electric wires stored in the battery case 80. Therefore, a situation will not happen, in which the manual operation and charging work of the service plug 40 become messy due to, for example, the fact that the plug 41 and the outlet 49a are hidden by the presence of the wire harnesses when detaching the upper lid 83.

Alternatively, the charging connector 49 may be mounted to the side wall of the battery case 80 (see two-dotted line in FIG. 1). Even in this case, the entire charging wire 50 (see FIG. 2) can be stored into the battery case 80, which is an advantage.

As shown in FIG. 3, a suspending member 84 which is a sheet metal of an inverted-U shape is firmly fastened to the top plate portion 72 of the battery frame 64. When the battery case 80 storing the battery assembly 79 is transported, a crane winch (not shown) is engaged with the suspending member 84 in a state in which the upper lid 83 is detached. This allows the battery case 80 with the upper lid 83 detached to be suspended together with the battery assembly 79. In this way, the battery case 80 with a heavy weight, incorporating the plurality of battery modules 61 (see FIG. 3), can be easily transported. Especially, by inserting the battery case 80 suspended by the suspending member 64 into a space between the right and left main frames 12 from outside and above the main frames 12, the battery case 80 can be mounted to the vehicle body frame 4. By attaching the upper lid 83 after the battery case 80 is mounted to the vehicle body frame 4, the battery case 80 having the closed space can be constructed.

Alternatively, the suspending member 84 may be attached to the side portion of the battery frame 64 instead of the top plate portion 72.

(Shape of Battery Case)

The shape of the battery case 80 will be described with reference to FIGS. 3 to 5. The case body 81 of the battery case 80 has substantially the same outer shape as that of the battery assembly 79. Therefore, the case body 81 does not have a precise rectangular parallelepiped shape but has a shape in which several portions are recessed in a box of a rectangular parallelepiped shape. The bottom wall of the case body 81 is a substantially flat plate. Since the upper surface of the upper lid 84 attached to the case body 81 is also flat, it is possible to prevent rain water from being accumulated on the battery case 80.

The lower portion of the rear wall of the case body 81 is offset forward relative to the upper portion of the rear wall of the case body 81. The front wall of the case body 81 is offset rearward in a stepwise manner, in an upward direction. This allows the inner surface of the battery case 80 to be made close to the rear surface, front surface and upper surface front portion of the lower section 65, the front surface and upper surface of the DC/DC converter 45, and the front surface of the upper section 66. As a result, the size of the case body 81 can be reduced to a smallest possible degree. As described above, it becomes possible to achieve both of prevention of interference between the battery case 80 and the handle 8 (see FIG. 1) and an increase in the battery capacity. In addition, it becomes possible to achieve both of prevention of interference between the battery case 80 and the rear end portion of the main frames 12 (see FIG. 1) and an increase in the battery capacity.

The width of the upper portion of the rear wall of the case body 81 is smaller than the width of the lower portion of the rear wall of the case body 81, and the upper rear portion of the side wall of the case body 81 is offset toward the center in the rightward or leftward direction. Thereby, a pair of rear recessed portions 85 which recede toward the center in the rightward or leftward direction are formed at right and left sides of the upper rear portion of the case body 81. By providing the rear recessed portions 85, the inner surface of the case body 81 can be made closer to the rear portion of the outer surface of the upper section 66, and the size of the case body 81 can be reduced to a smallest possible degree. In addition, as described above, the rider can easily grip the case body 81 with the knee and increase the battery capacity.

Schematically, each of the rear recessed portions 85 is surrounded by a first offset side wall 86 which is substantially parallel to the side wall and is located closer to the center in the rightward or leftward direction than the side wall, an offset rear wall 87 which is substantially parallel to the rear wall and is located forward relative to the rear wall, and a first offset upper wall 88 which is substantially horizontal and connects the lower edge of the first offset side wall 86 to the lower edge of the offset rear wall 87. The first offset upper wall 88 is connected to the side wall and rear wall of the case body 81. The offset rear wall 87 is located forward relative to the rear wall and rearward relative to the center of the entire case body 81 in the forward or rearward direction.

The power wire 31p extends rearward from the upper end portion of the right offset rear wall 87 along the outer surface of the first offset side wall 86, and downward along the outer surface of the rear wall of the case body 81. The ground wire 31n penetrates the left offset rear wall 87 and extends as in the power wire 31p. Thus, the case body 81 is required to have a through-hole to guide the high-voltage electric wire 31 from inside of the battery case 80 to outside. This through-hole is formed in the upper rear portion of the case body 81 and oriented rearward. This makes it possible to suitably prevent rain water or the like from entering the battery case 80 through the through-hole.

The upper front portion of the side wall of the case body 81 is offset toward the center in the rightward or leftward direction. Thereby, a pair of front recessed portions 89 which recede toward the center in the rightward or leftward direction are formed at right and left sides of the upper front portion of the case body 81. Schematically, each of the front recessed portions 89 is surrounded by three side walls which are a second offset side wall 90 which is substantially parallel to the side wall and is located closer to the center in the rightward or leftward direction than the side wall, a second offset upper wall 91 which is substantially horizontal and connects the side wall to the second offset side wall 90, and an offset front wall 92 which vertically rises from the rear edge of the second offset side wall 90. The offset front wall 92 is connected to the second offset side wall 90 and the side wall of the case body 81.

The opening 82 of the battery case 80 is defined by the upper edge of the front wall of the case body 81, the upper edges of the pair of first offset side walls 86, the upper edges of the pair of offset front walls 92, the upper edges of the pair of side walls of the case body 81, the upper edges of the pair of offset rear walls 87, the upper edges of the pair of second offset side walls 90, and the upper edges of the rear walls of the case body 81. The opening 82 basically has a rectangular shape when viewed from above, which surrounds the rectangular shape in which the inside electric components 30 are placed, from outside with a little gap between the rectangular region and the opening 82. Since the opening 82 is thus formed, the inside electric components 30 can be seen and accessed through the opening 82. Furthermore, the opening 82 has a shape in which the intermediate portion of the rectangular shape in the forward or rearward direction protrudes rightward and leftward. Through this protruding portion, the terminal block 78 (see FIG. 3) for the high-voltage electric wire 31 can be seen, and maintenance of the high-voltage electric wire 31 can be carried out easily.

By comparison, the second offset upper wall 91 is lower than the upper edge of the wall defining the opening 82, and is located outward in the rightward or leftward direction relative to the upper edge of the wall defining the opening 82. The second offset upper wall 91 covers the non-mounting surface 61d from above. This makes it difficult for the rider or the maintenance operator to access a region outside of the rectangular region, which is an advantage. In other words, the upper edge of the wall defining the opening 82 is higher than the upper surface of the battery unit 60. This makes the upper edges of the walls defining the opening 82 higher than the inside electric components 30 within the rectangular region, and the walls defining the opening 82 can cover the inside electric components 30 from forward, rearward, rightward and leftward. Therefore, in a state in which the opening 82 is opened, the inside electric components 30 can be favorably protected from outside. In addition, the inside electric components 30 are placed with a gap with the inner surface of the battery case 80. Therefore, even if water droplets are formed on the inner surface of the battery case 80, it becomes possible to prevent a moisture from adhering to the inside electric components.

A battery monitoring unit 58 is mounted to the right side surface of the battery case 80. As shown in FIG. 1, the vehicle control unit 59 is mounted to the left side surface of the battery case 80. Since the right and left side surfaces of the battery case 80 are surrounded by the main frames 12, the controllers 58, 59 can be favorably controlled. In addition, since many electronic components are arranged within the battery case 80, the electric wires connected to the controllers 58, 59 can be compactly laid out.

(Air Cooling of Battery Case)

FIG. 6 is a cross-sectional view of the battery case 80 of FIG. 4, when viewed from rightward. As shown in FIG. 6, the inside electric components 30, which are other than the DC/DC converter 45, are placed above the battery unit 60. Therefore, heat radiated from the inside electric components 30 is less likely to be transmitted to the battery unit 60. This makes it possible to suitably suppress degradation of the battery unit 60 by the heat. The inside electric components 30, including the DC/DC converter 45, are placed in the upper portion in the interior of the battery case 80. Therefore, even if the rain water or the like enters the battery case 80, the inside electric components 30 is less likely to be immersed in water accumulated in the battery case 80.

The battery case 80 includes an air inlet 101 provided at the front portion of the case body 81 to introduce the air from outside into the battery case 80, and an air outlet 102 provided at the rear portion of the case body 81 to discharge the air from inside of the battery case 80 to outside. The air inlet 101 is placed to face the DC/DC converter 45. The air outlet 102 is disposed at the upper portion of the battery case 80 in a position which is higher than the battery unit 60. The inside electric components 30 are placed between the air inlet 101 and the air outlet 102 in the forward or rearward direction.

The air discharge duct 22 is coupled to the air outlet 102. The inner space of the battery case 80 is communicated with the inner space of the inverter case 19 (see FIG. 1) via the air outlet 102 and the air discharge duct 22. The air outlet 102 is attached with the exhaust fan 55. The indoor fan 56 is attached to the front portion of the inner bottom surface of the battery case 80. The indoor fan 56 is placed between the bottom wall of the battery case 80 and the bottom plate portion 67 of the battery frame 64.

With reference to FIG. 4, the front wall of the case body 81 includes a converter cover section 103 covering the DC/DC converter 45, and the converter cover section 103 has a pair of right and left taper portions 103a at right and left sides which are inclined rearward as they are outward in the rightward or leftward direction.

The air inlet 101 penetrates the right taper portion 103a, while the air-intake duct 21 is connected to an air inlet 101. The air-intake duct 21 extends rearward such that it is inclined rightward from the air-intake port 21a at an upstream end thereof and is connected to the air inlet 101. The air-intake duct 21 extends from the air-intake port 21a to the air inlet 101 in such a manner that it is firstly oriented downward, then oriented substantially horizontally, and then oriented rearward and upward. Since the air-intake duct 21 has a portion which is lower than the air-intake port 21a and the air inlet 101, the rain water or the like can be captured within the air-intake duct 21 even if the rain water or the like enters the air-intake duct 21 through the air-intake port 21a. Thus, it becomes possible to suitably prevent the rain water or the like from entering the battery case 80 through the air-intake duct 21. As described above, since the air-intake port 21a is positioned forward relative to the front fork 6 (see FIG. 1), it becomes possible to suitably prevent mud splashed by the front wheel 2 from entering the air-intake duct 21.

With reference to FIG. 1, the converter cover section 103 is provided in an intermediate portion of the battery case 80 in the vertical direction such that the converter cover section 103 overlaps with the main frame 12 and is close to the head pipe 11 in the forward or rearward direction when viewed from a side. Because of this, the air-intake port 21a is positioned forward relative to the front fork 6 with the air-intake duct 21 reduced to a shortest possible length. Therefore, a passage resistance in the air-intake duct 21 can be reduced significantly, so that the ram air can be smoothly sent to the interior of the battery case 80.

Figure 7:
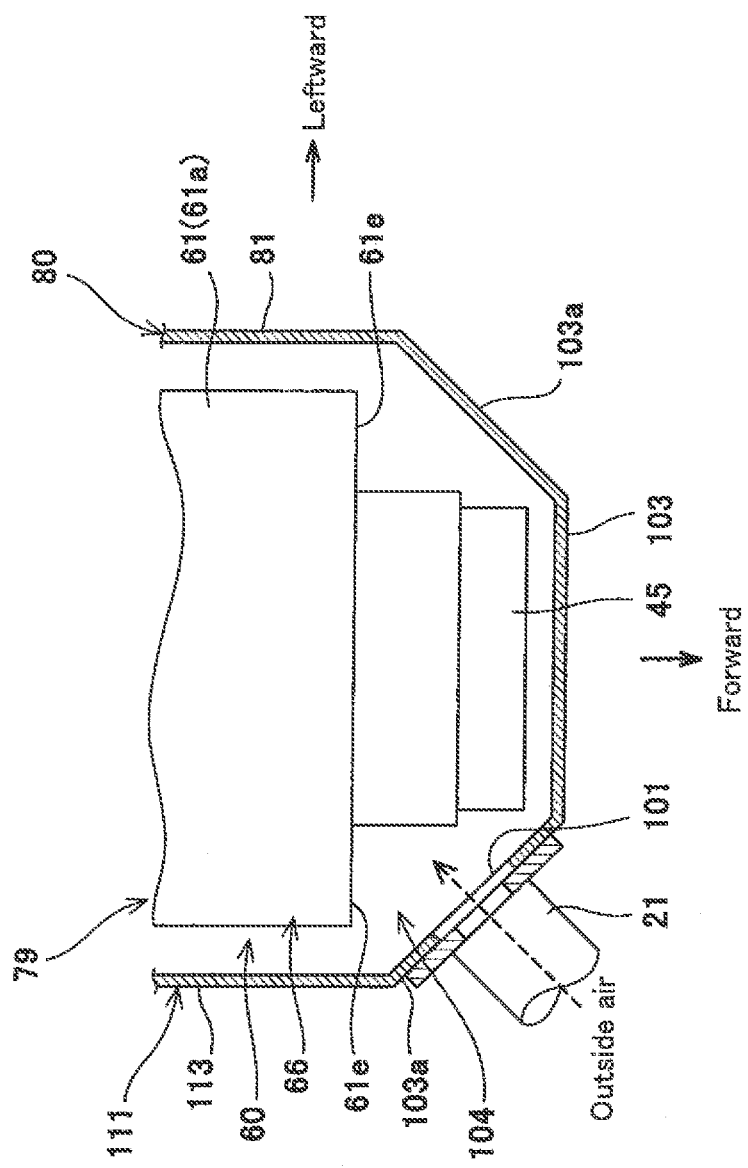
FIG. 7 is a partial cross-sectional view of the battery case of FIG. 4, when viewed from above.

FIG. 7 is a partial cross-sectional view of the battery case 80 of FIG. 4. As shown in FIG. 7, the width of the DC/DC converter 45 is smaller than the width of front portion of the upper section 66. The front surface of the upper section 66 constitutes an uncovered surface 61e which is not covered with the DC/DC converter 45, in a portion which is outward relative to the DC/DC converter 45 in the rightward or leftward direction. By comparison, as described above, the converter cover section 103 has the pair of taper portions 103a, and the front surface of the DC/DC converter 45 is covered with a portion of the DC/DC converter 45 which is sandwiched between the pair of taper portions 103a. The taper portions 103a covers the uncovered surface 61e and a distance between the uncovered surface 61e and the inner surface of taper portion 103a increases toward the center in the rightward or leftward direction. Because of this, in the interior of the battery case 80, there is formed an air space 104 of a substantially right triangle shape when viewed from above, which is surrounded by the taper portions 103a, the upper section 66 and the DC/DC converter 45, in a region which is outward relative to the DC/DC converter 45 in the rightward or leftward direction.

The air inlet 101 opens in the air space 104 and faces the DC/DC converter 45 with the air space 104. Because of this, the air can smoothly flow into the battery case 80 after the air has flowed through the air-intake duct 21, and hence the interior of the battery case 80 can be easily cooled by the ram air. In the interior of the battery case 80, the air is blown to the DC/DC converter 45. Among the inside electric components 30, especially, the DC/DC converter 45 generates a great amount of heat during the operation. Since the air is blown to the DC/DC converter 45 in an initial stage of the air inflow to the battery case 80, the DC/DC converter 45 can be suitably cooled by the air, and hence a temperature increase in the entire interior of the battery case 80 can be suitably suppressed.

Turning back to FIG. 6, in the interior of the battery case 80, the air flows toward the air outlet 102. Since the inside electric components 30 and the battery unit 60 are placed between the air inlet 101 and the air outlet 102, heat radiated from the inside electric components 30 and the battery unit 60 can be expelled to outside the battery case 80, by the air flow. Thus, it becomes possible to prevent a situation in which the heat radiated from the inside electric components 30 and the battery unit 60 is accumulated in the interior of the battery case 80. Especially since the air outlet 102 is provided at the upper portion of the battery case 80, the air flows from the air inlet 101 toward the air outlet 102 through the upper portion of the battery case 80. This makes it possible to suitably expel the heat transferred from the battery unit 60 to an upper region, by convection, or the heat radiated from the inside electric components 30, to outside of the battery case 80.

During driving, the air sent to the battery case 80 increases in amount, which can rotate the exhaust fan 55 by itself irrespective of the fan controller 57. According to the rotation of the exhaust fan 55, an air flow directed toward the exhaust fan 55 can be formed in the interior of the battery case 80. In light of this, during driving, the fan controller 57 (see FIG. 2) does not electrically actuate the exhaust fan 55. However, when the vehicle is in a stopped state or is driving at a low speed, a sufficient amount of air flow is not sent to the interior of the battery case 80, and it may be difficult to rotate the exhaust fan 55 by itself. In light of this, when the vehicle speed becomes equal to or lower than a predetermined low speed, the fan controller 57 electrically actuates the exhaust fan 55 to rotate it. The exhaust fan 55 is electrically controlled in this way. During driving of the vehicle, the air flow is formed in the interior of the battery case 80 and cools the interior of the battery case 80, without consuming the electric power in the exhaust fan 55. On the other hand, under the situation in which the air flow is not sent sufficiently, the interior of the battery case 80 can be suitably cooled by using the exhaust fan 55 which is electrically actuated.

The exhaust fan 55 may be controlled to be rotated in the same direction as the direction in which the exhaust fan 55 rotates itself, to form the air flow from the air inlet 101 toward the air outlet 102, or in a direction opposite to the direction in which the exhaust fan 55 rotates itself, to form the air flow from the air outlet 102 toward the air inlet 101.

The indoor fan 56 may be controlled to operate along with the exhaust fan 55 during, for example, a charging work. At this time, the air blown from the indoor fan 56 flows toward the exhaust fan 55. The indoor fan 56 is provided at the front portion of the inner bottom surface of the battery case 80, while the exhaust fan 55 is provided at the upper rear portion of the battery case 80. Because of this, the air flows from the indoor fan 56 toward the exhaust fan 55 through the battery unit 60 such that the air flow is directed upward and rearward. Therefore, the heat radiated from the battery unit 60 during the charging can be expelled to outside the battery case 80. The indoor fan 56 may be controlled to operate during driving and a temporarily stopped state.

After flowing through the air outlet 102, the air is guided to the interior of the inverter case 19 (see FIG. 1) through the air discharge duct 22. Among the electric components mounted in the electric motorcycle 1, especially, the inverter 20 (see FIG. 1) generates a great amount of heat during its operation. Therefore, the inverter 20 can be cooled by the air discharged from the battery case 80. Since the air discharge duct 22 for discharging the air from the battery case 80 serves as a duct for supplying cooling air to the interior of the inverter case 19, the configuration of the entire device for cooling the electric components by the air can be simplified.

It should be noted that air discharge duct 22 may be omitted. Even if the air discharge duct 22 is omitted, it becomes possible to suitably prevent the rain water or the like from entering the battery case 80 through the air outlet 102, because the air outlet 102 is provided at the upper portion of the battery case 80. In the above stated example, only the air outlet 102 is provided at the upper portion of the battery case 80. However, so long as at least one of the air inlet 101 and the air outlet 102 is provided at the upper portion of the battery case 80, the inside electric components 30 placed on the battery unit 60 can be suitably cooled by the air flowing from the air inlet 101 toward the air outlet 102.

(Mounting of Battery Case and Battery Assembly)

Next, assembling of the battery case 80 and mounting of the battery case 80 and the battery assembly 79 will be described. As shown in FIG. 5, the battery case 80 includes a first case member 111 and a second case member 112, which are joined together such that they are horizontally separable from each other. These two case members 111, 112 are manufactured by molding using a synthetic resin which is a material having an electric insulativity. These two case members 111, 112 are manufactured by a material having a smaller specific weight and a lower stiffness than the material of the battery frame 64 and the material of the vehicle body frame 4.

By joining these two case members 111, 112 together, the case body 81 having the opening 82 is formed. In the present embodiment, the first case member 111 and the second case member 112 are separable from each other in the forward or rearward direction.

The first case member 111 includes a first body section 113 constituting the front portion of the case body 81 and a first flange section 114 provided at the rear end of the first body section 113. The second case member 112 includes a second body section 115 constituting the rear portion of the case body 81 and a second flange section 116 provided at the front end of the second body section 115. The first flange section 114 is engageable with the second flange section 116 such that the first flange section 114 is directly or indirectly joined to the second flange section 116 without a clearance in a thickness direction. The outer surface of the first flange section 114 is provided with a plurality of first case joining sections 117 into which bolts 133 are inserted, respectively. The outer surface of the second flange section 116 is provided with a plurality of second case joining sections 118.

The first body section 113 has, in a state in which the battery case 80 is incorporated into the electric motorcycle 1, a bottom wall, and front, left and right walls extending upward from the bottom wall such that they are bent, and opens rearward and upward. The first flange section is provided adjacently to the rear end of the first body section, and thus has a substantially-U shape when viewed from rearward. The second body section 115 has, in a state in which the battery case 80 is incorporated into the electric motorcycle 1, a bottom wall, rear, left and right walls extending upward from the bottom wall such that they are bent and opens forward and upward. The second flange section 116 is provided adjacently to the front end of the second body section 115, and thus has a substantially-U shape when viewed from rearward.

The flange sections 114, 116 protrude outward of the case (except for forward or rearward because each of the flange sections 114, 116 is not provided at the front wall and the rear wall) farther than the corresponding adjacent portions of the body sections 113, 115. The term "outward of the case" means outward of the battery case 80 in the thickness of the battery case 80. "outward of the case" is leftward from the perspective of the left wall of the first body section 113 and is downward from the perspective of the bottom wall of the first body section 113. Inward of the case is opposite to "outward of the case". "Inward of the case" is rightward from the perspective of the left wall of the first body section 113 and is upward from the perspective of the bottom wall of the first body section 113. The thickness of the flange sections 114, 116 is greater than the thickness of the adjacent portions.

Now, the steps of assembling the battery case 80 and the steps of joining the battery case 80 and the battery assembly 79 to each other will be described in brief. The directions described below are from the perspective of the rider in a state in which the assembling is finished and the battery case 80 and the battery assembly 79 are mounted to the vehicle body frame 4.

(1) Initially, the second case member 112 is moved in the forward or rearward direction relative to the battery assembly 79, and the rear portion of the battery assembly 79 is stored into the second body section 115 through a U-shaped open space defined by the second flange section 116. (2) Then, the battery assembly 79 is joined to the second case member 112. At this time, the front portion of the battery assembly 79 protrudes forward farther than the second flange section 116. (3) Then, the first case member 111 is moved in the forward or rearward direction relative to the battery assembly 79, and the front portion of the battery assembly 79 is stored into the first body section 113 through a U-shaped open space defined by the first flange section 114. In a final stage of this storage, the first flange section 114 and the second flange section 116 are engaged with each other and the first case joining sections 117 and the second case joining sections 118 contact each other. (4) Then, the bolts are inserted into the first case joining sections 117 and the second case joining sections 118, respectively. Thereby, the first case member 111 and the second case member 112 are fastened to each other, thereby constituting the case body 81. (5) Then, the upper lid 83 is detachably joined to the case body 81 such that the upper lid 83 covers the opening 82 of the case body 81. Thus, the battery case 80 containing the battery assembly 79 is finished.

In description below, in some cases, a relative movement direction (e.g., forward) of the second case member 112 in the case where the battery assembly 79 is stored into the second body section 115, and a relative movement direction (e.g., rearward) of the first case member 111 in the case where the battery assembly 79 is stored into the first body section 113 will be referred to as "insertion direction." Since the front surface of each of the first case joining sections 117 and the rear surface of the corresponding second case joining section 118 are in contact with each other when two case members 111, 112 are joined together, the front surface of each of the first case joining sections 117 and the rear surface of the corresponding second case joining sections will be hereinafter sometimes collectively referred to as "joint surfaces". In a state in which the two case members 111, 112 are joined together, the two flange sections 114, 116 which are engaged with each other constitute the separable portions of the case body 81. In the present embodiment, as will be described later, since the flange sections 114, 116 are fitted together, they do not form a separation "line" in a strict sense.

The flange section (i.e., first flange section 114) formed in the case member (i.e., first case member 111) which is forward relative to the separable portions, covers the other case member (i.e., second case member 112), from outward of the case. In the separable portions, the flange sections 114, 116 directly or indirectly overlap with each other in the thickness direction. In the present embodiment, as will be described later, a recessed portion which opens rearward is formed in the first flange section 114 placed at a forward side, and a convex portion fitted to the recessed portion in engagement is formed in the second flange section 116 placed at a rearward side, thereby forming the above stated overlapping portions.

Since the case body 81 is dividable in the forward or rearward direction, the joint surfaces extend substantially in the rightward or leftward direction and substantially in the vertical direction, and the parting line extends in the rightward or leftward direction above the bottom wall of the case body 81 and in the vertical direction above the pair of right and left side walls. In the present embodiment, the parting line extends in the rightward or leftward direction above the center portion of the bottom wall in the forward or rearward direction. As described above, the rear upper portion of the battery assembly 79 is offset rearward relative to the rear lower portion of the battery assembly 79, while the front upper portion of the battery assembly 79 is offset rearward relative to the front lower portion of the battery assembly 79. When the second case member 112 at a rear side, of the two case members 111, 112, is firstly mounted to the battery assembly 79, a protruding portion of the upper portion of the battery assembly 79, which protrudes from the second case member 112, after the step (2), can be reduced. Therefore, the battery assembly 79 can be favorably protected when the step (2) and the step (3) are performed.

Hereinafter, the structure associated with the steps (1) to (4) will be described.

(Flange Section)

Figure 8:
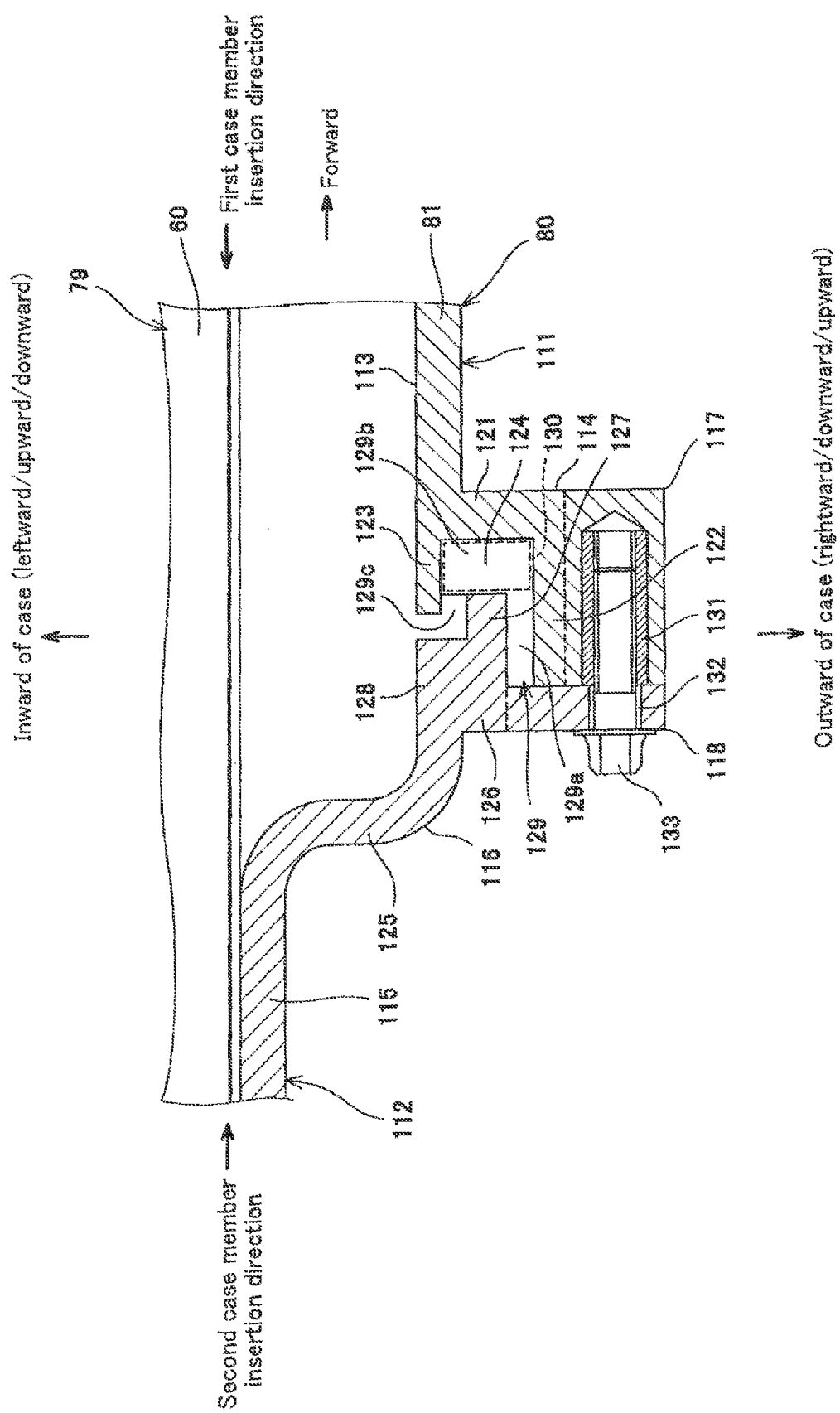
FIG. 8 is a partial cross-sectional view of the battery case of FIG. 4, when viewed from above.
Figure 9:
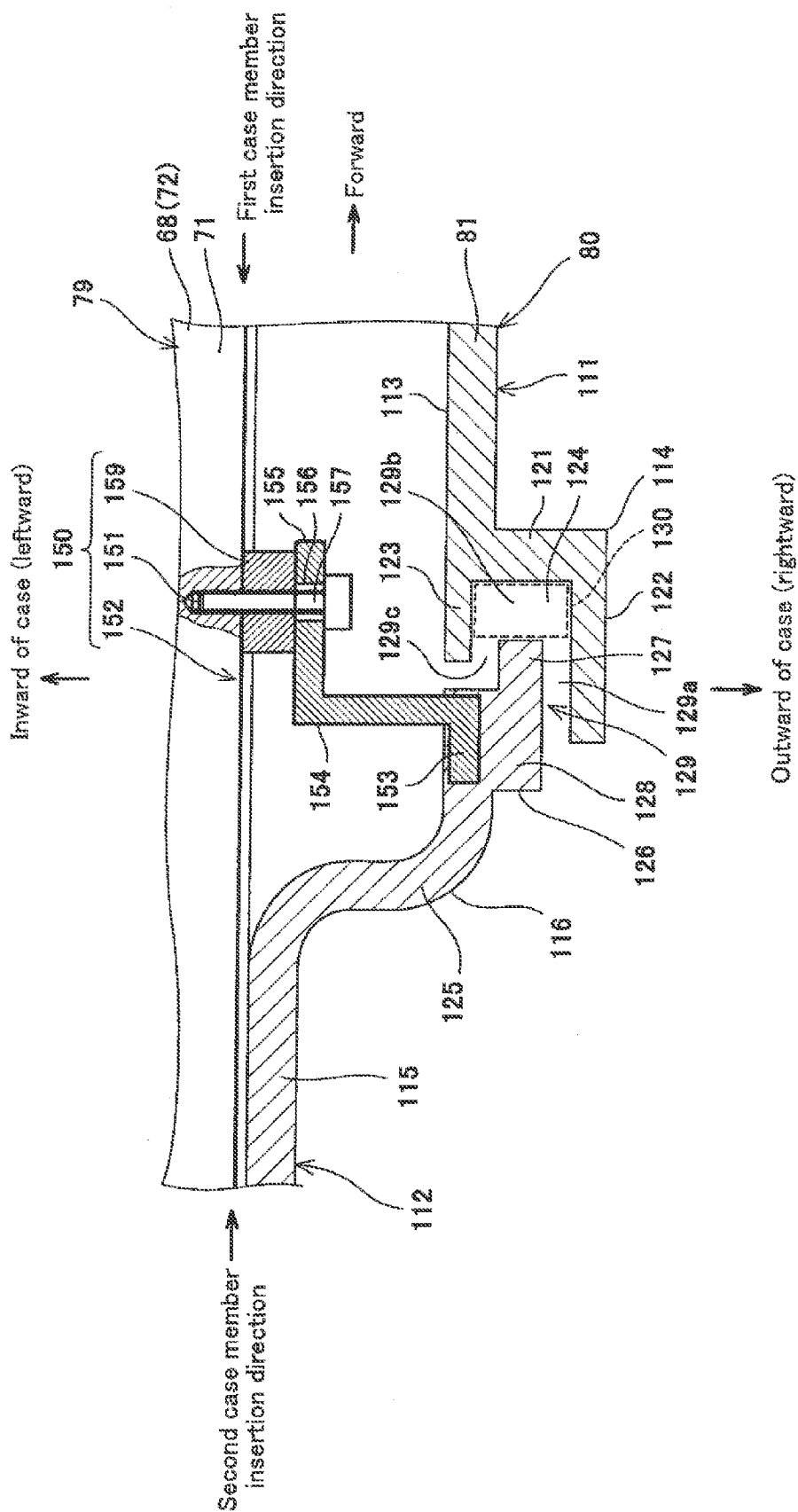
FIG. 9 is a partial cross-sectional view of the battery case of FIG. 4, when viewed from above.

Initially, the flange sections 114, 116 associated with the step (3) will be described. FIGS. 8 and 9 are partial cross-sectional views of the battery case 80 of FIG. 1, when viewed from above. As shown in FIGS. 8 and 9, the case body 81 is configured such that the first flange section 114 is oriented rearward and the second flange section 116 is oriented forward. The first flange section 114 protrudes outward of the case from the rear end portion of the first body section 113 and then is bent rearward, thus having a substantially-L-shaped cross-section. In other words, the first flange section 114 includes a first outward protruding portion 121 which protrudes outward of the case from the rear end portion of the first body section 113, and a rearward protruding portion 122 which protrudes rearward from the tip end of the first outward protruding portion 121.

In other words, the first flange section 111 has a cover portion extending from the first body section 113 in a direction different from forward in a driving direction and beyond the parting line (or front end of the second flange section 116). Preferably, the cover portion 122 extends rearward. However, the cover portion 122 may extend in any direction except for forward.

The first case member 111 has an extending portion 123 extending rearward from the rear edge of the first body section 113. The extending portion 123 is parallel to the rearward protruding portion 122 of the first flange section 114. Although in FIGS. 8 and 9, only the cross-section is shown, the extending portion 123 is provided with no discontinuity at the rear end portion of the first body section 113 such that it has a U-shape when viewed from rearward, as in the first flange section 114. Thereby, there is formed an engagement groove 124 at the rear end of the first case member 111, which is surrounded by the first flange section 114 and the extending portion 123. The engagement groove 124 opens rearward and has a U-shape when viewed from rearward.

The second flange section 116 protrudes outward of the case from the front end portion of the second body section 115 and then is bent forward. The second flange section 116 includes a second outward protruding portion 125 which protrudes outward of the case from the front end portion of the second body section 115, and a forward protruding portion 126 which protrudes forward from the tip end of the second outward protruding portion 125. The tip end of the forward protruding portion 126 is an engagement protrusion 127 fitted to the engagement groove 124. The forward protruding portion 126 has a thickened portion 128 which is provided rearward relative to the engagement protrusion 127 and has a greater thickness than the engagement protrusion 127 and the second body section 115. The outer surface of the thickened portion 128 is coplanar with the outer surface of the engagement protrusion 127. Because of this, the inner surface of the thickened portion 128 is located inward of the case relative to the inner surface of the engagement protrusion 127.

In the step (3), when the engagement protrusion 127 is received in the engagement groove 124, at least a portion of the thickened portion 128 overlaps with the rearward protruding portion 122 of the first flange section 113, in the thickness direction of the case. The rearward protruding portion 122 is located outward of the case relative to the second flange section 115. Therefore, a clearance 129 formed between the first flange section 113 and the second flange section 114 has a labyrinth shape. Specifically, the clearance 129 includes a clearance 129a extending in the forward or rearward direction, between the inner surface of the rearward protruding portion 122 and the outer surface of the forward protruding portion 126, a clearance 129b formed forward relative to the engagement protrusion 127, and a L-shaped clearance 129c formed between the inner surface of the forward protruding portion 126 and the extending portion 123. The front end of the clearance 129a opens to outside of the battery case 80, while the inner end of the clearance 129c opens to inside of the battery case 80. The clearance 129 is turned back at a right angle three times in a range from the front end of the clearance 129a to the end of the clearance 129c which is inward of the case.

Since the first flange section 113 is oriented rearward, the front end of the clearance 129a is also oriented rearward. Therefore, even when the two case members 111, 112 are separably joined together to form the case body 81, it becomes possible to suitably prevent the rain water or the like from entering the clearance 129 formed in the location at which the two case members 111, 112 are separable from each other. Even if the rain water or the like enters the clearance 129, it becomes possible to suitably prevent the rain water or the like from entering the battery case 80, because the clearance 129 has the labyrinth shape.

A seal 130 which is an elastic body made of rubber or the like may be provided in advance in the clearance 129b. The seal 130 may be crushed by the engagement protrusion 127 and elastically deformed by a forward pressing force, thereby sealing the clearance 129c from the clearance 129a. The seal 130 is elastically deformed in the forward or rearward direction, i.e., direction in which the bolts 133 are inserted. By maintaining the elastically deformed state by the fastening member in this way, the clearance is not formed between the case members 111, 112. In this case, even when the rain water or the like enters the clearance 129a, it becomes possible to prevent the rain water or the like from entering the interior of the battery case 80.

The engaged state between the first flange section 114 and the second flange section 116 refers to a state in which a portion of the first flange section 114 and a portion of the second flange section 116, which portions vertically overlap with each other, exist in the vicinity of the parting line formed above the bottom surface, in the case body 81 in the joined state, for example, a state in which the convex portion is fitted into the recessed portion. Since the thickness of the case in the vicinity of the parting line is greater than the thickness of the remaining portion in the case body 81 in the joined state, the stiffness of the case for bearing the battery unit 80 (or the battery assembly 79) from below can be improved. In other words, the flange sections 114, 116 are preferably formed with contact surfaces by which the flange sections 114, 116 are vertically in contact with each other, in a position different from the parting line.

As described above, the two flange sections 114, 116 protrude outward of the case, from the first body section 113 and the second body section 115, respectively. In addition, the two flange sections 114, 116 are engaged with each other so as to overlap with each other in the thickness direction of case. Therefore, when the battery case 80 is seen in a macroscopic manner, the two flange sections 114, 116 serve as ribs with a great thickness extending with no discontinuity above the left side wall, the bottom wall and the right side wall, in the center portion of the case body 81 in the forward or rearward direction. This can improve the stiffness of the case body 81. Especially, in the present embodiment, since the first and second case members 111, 112 are separable from each other in the forward or rearward direction, the two flange sections 114, 116 serving as the ribs extend above the bottom surface. This allows the battery case 80 made of a synthetic resin to stably bear the battery assembly 79 with a heavy weight. The two flange sections 114, 116 constitute the parting line. Since the parting line has a high strength, the stiffness of the case body 81 can be improved even when the case body 81 is formed by joining the two case members 111, 112 together such that they are separable from each other.

In the case body 81 which is dividable, the first flange section 114 located outward of the case may be oriented in any direction other than forward, to suitably prevent entry of the rain water or the like.

To merely improve the stiffness, it is sufficient that the flange sections 114, 116 extend above the bottom wall. In this case, the case body 81 may be dividable horizontally, including a component in the rightward or leftward direction, or a component in the forward or rearward direction and the component in the rightward or leftward direction. In a case where the case body 81 is dividable in the forward or rearward direction, entry of the rain water or the like can be suitably prevented and the stiffness can be improved.

(Case Joining Section)

Next, the case joining sections 117, 118 associated with the step (3) and the step (4) will be described. As shown in FIG. 8, the first case joining section 117 is provided on the outer surface of the forward protruding portion 126 of the first flange section 114. The first case joining section 117 has a bottomed cylinder shape which opens at its front end and is closed at its rear end. The axis of the first case joining section 117 is oriented in the forward or rearward direction in a location outward of the case relative to the first body section 113. The first case joining section 117 contains a metal-made nut 131. In this way, the first case joining section 117 is a hexagon cap nut having the outer surface made of a synthetic resin and a threaded inner surface made of metal. The nut 131 may be manufactured by insert-molding, or pressed-in after the first case member 111 is molded. The second case joining section 118 is provided on the outer surface of the thickened portion 128 of the second flange section 116. The second case joining section 118 has a cylindrical shape which opens at both ends. The axis of the second case joining section 118 is oriented in the forward or rearward direction in a location outward of the case relative to the second body section 115. The second case joining section 118 has an axial hole 132 which opens in the forward or rearward direction.

In the step (3), concurrently with the engagement between the two flange sections 114, 116, the front surface of the first case joining section 117 contacts the rear surface of the second case joining section 118, and the axial hole 132 is communicated with the nut 131. In the step (4), the bolt 133 is inserted into the axial hole 132 from behind the second case joining section 118 and threadingly engaged with the nut 131. This allows the two case members 111, 112 to be firmly joined together.

As described above, the two case joining sections 117, 118 are provided on the outer surface of the battery case 80. In other words, the battery case 80 is not provided with a through-hole for joining the two case members 111, 112 together. This makes it possible to prevent the rain water or the like from entering the battery case 80. Furthermore, the axial hole 132 opens rearward. This makes it possible to suitably prevent a situation in which the head portion of the bolt 133 or the axial hole 132 is clogged with mud splashed by the wheels 2, 3 (see FIG. 1), and disassembling work of the battery case 80 becomes messy. The first case joining section 117 constitutes a hexagon cap nut closed at its front end. Therefore, the nut 131 is not clogged with mud.

The case joining sections 117, 118 do not have a through-hole in the thickness direction of the battery case 80. In the battery case 80 provided with the case joining sections 117, 118, a hole for communicating the interior and exterior of the battery case 80 with each other is not formed. In the present embodiment, as described above, the nut 131 having the axis extending in the forward or rearward direction outside the case is buried during the molding of one of the case members (e.g., first case member 111). The nut and the through-hole are configured so that the center axis of the nut and the center axis of the through-hole are aligned with each other when the case members are engaged with each other. By engaging the fastening member (bolt 133) inserted into the through-hole 132, with the nut 131, the pair of case members 111, 112 are fastened to each other in the forward or rearward direction.

When the hole does not penetrate the nut 131, the nut having the axis in the thickness direction of the battery case 80 may be buried. In the above configuration which is different from this, since the pair of case members are separable from each other in the forward or rearward direction, and the hole of the nut 131 extends in the forward or rearward direction, it becomes possible to prevent the interior of the battery case 80 from being communicated with the exterior of the battery case 80. Alternatively, the case joining sections 117, 118 may have the through-holes extending in the forward or rearward direction, respectively, the center axes of these through-holes may be aligned with each other when the case members 111, 112 are engaged with each other, and the pair of case members 111, 112 may be fastened to each other in the forward or rearward direction by the fastening member inserted into the through-holes.

(Positioning Section)

Next, positioning sections 140, 145 associated with the step (1) and the step (3) will be described. As shown in FIG. 6, the second case member 112 has a positioning portion 141 protruding inward of the case, from the inner wall in the insertion direction in the step (1). In the present embodiment, the insertion direction is the forward or rearward direction, and the second case member 112 is movable forward relative to the battery assembly 79 in the step (1). Because of this, the positioning portion 141 protrudes forward in a substantially horizontal direction from the rear wall of the second body section 115. By comparison, the intermediate plate portion 71 of the battery frame 64 has in its rear surface an open slit 142. The positioning portion 141 and the slit 142 constitute the positioning section 140 for positioning the battery assembly 79 with respect to the second case member 112.

The first case member 111 has a positioning portion 146 protruding inward of the case, from the inner wall in the insertion direction in the step (3). In the present embodiment, the insertion direction is the forward or rearward direction, and the first case member 111 is movable rearward relative to the battery assembly 79 in the step (3). Because of this, the positioning portion 146 protrudes rearward in a substantially horizontal direction from the front wall of the first body section 113. By comparison, the lower front cover portion 69 of the battery frame 64 has in its front surface an open slit 147. The positioning portion 146 and the slit 147 constitute the positioning section 145 for positioning the battery assembly 79 with respect to the first case member 111.

The positioning portions 141, 146 are, for example, metal plates, and are provided during molding of the corresponding case members 111, 112, by insert-molding. FIG. 6 is a side cross-sectional view, and therefore only one positioning section 140 is shown. However, the plurality of positioning sections 140 may be provided to be spaced apart from each other in the rightward or leftward direction (direction orthogonal to the drawing sheet of FIG. 6). The same applies to the positioning sections 145.

In the step (1), the second case member 112 is moved in the insertion direction relative to the battery assembly 79. When the rear portion of the battery assembly 79 becomes close to the inner rear surface of the second case member 112, the positioning portion 141 is inserted into the slit 142. This allows the battery assembly 79 to be positioned with respect to the second case member 112. Therefore, in the step (2), the second case member 112 can be easily fastened to the battery assembly 79. In the step (3), the same occurs as follows. The first case member 111 is moved in the insertion direction relative to the battery assembly 79. When the front portion of the battery assembly 79 becomes close to the inner front surface of the first case member 111, the positioning portion 146 is inserted into the slit 147.

In a state in which the positioning portions 141, 146 are inserted into the corresponding slits 142, 147, respectively, it is possible to suitably inhibit the battery assembly 79 from being moved relatively in the vertical direction and in the rightward or leftward direction. The two positioning sections 140, 145 can cooperate to inhibit the battery assembly 79 from being moved in the forward or rearward direction with respect to the two case members 111, 112. This makes it possible to inhibit the battery assembly 79 from being displaced with respect to the battery case 80 in the interior of the battery case 80. As a result, a weight balance of the vehicle can be stabilized during driving.

The positioning sections 140, 145 having the above configuration are placed in the inner space of the battery case 80. In a state in which the assembling of the battery case 80 is completed, the positioning sections 140, 145 cannot be seen from outside. That is, the battery case 80 is not provided with the through-hole for positioning the battery assembly 79 with respect to the two case members 111, 112. This makes it possible to suitably prevent the rain water or the like from entering the battery case 80 while allowing the battery assembly 79 to be positioned with respect to the case members 111, 112.

(Battery Fastening Section)

Next, a battery fastening section 150 associated with the step (2) will be described. As shown in FIG. 6, the intermediate plate portion 71 of the battery frame 64 has a pair of right and left threaded holes 151 which open outward in the rightward or leftward direction (In FIG. 6, only the right threaded hole 151 is shown).

As shown in FIG. 9, the second case member 112 includes a pair of right and left brackets 152 (in FIG. 9, only the right bracket 152 is shown) for fastening the second case member 112 to the battery assembly 79. The brackets 152 are manufactured by bending the metal plates and buried into the second case member 112 by insert-molding during the molding of the second case member 112. Each of the brackets 152 includes an inward protruding portion 153 protruding inward of the case from the thickened portion 128 of the second flange section 116, and a mounting portion 154 which protrudes forward from the tip end of the inward protruding portion 153 such that it is bent. The threaded holes 151 and the brackets 152 constitute the battery fastening section 150 for fastening the battery assembly 79 to the battery case 80.

As described above, in the step (1), in a state in which the battery assembly 79 is positioned with respect to the second case member 112 by using the positioning section 140 (see FIG. 6), the inner surface of each of the mounting portions 154 contacts the side surface of the intermediate plate portion 71. A through-hole 155 formed in the mounting portion 154 is connected to the threaded hole 151 which opens in the side surface of the intermediate plate portion 71. In the step (2), a bolt 156 is inserted into the through-hole 155 from outside in the rightward or leftward direction and threadingly engaged with the threaded hole 151. This allows the second case member 112 to be firmly fastened to the battery assembly 79 via the brackets 152. Since the mounting portion 154 protrudes forward farther than the front end of the second flange section 116, fastening of the bolt 156 can be carried out easily.

As described above, the brackets 152 are provided on the second flange section 116 which contributes to improvement of the strength of the battery case 80. Since the battery assembly 79 is coupled to the second flange section 116 via the brackets 152, the battery case 80 can stably support the battery assembly 79. In addition, it becomes possible to inhibit the battery assembly 79 from being displaced with respect to the battery case 80 in the interior of the battery case 80. As should be understood from this, along with the positioning sections 140, 145 the battery fastening section 150 also serve as the positioning section for inhibiting the battery assembly 79 from being displaced. Especially, in the present embodiment, since the brackets 152 are buried into the thickened portion 128 of the second flange section 116, the battery assembly 79 can be stably supported.

The battery fastening section 150 is placed in the inner space of the battery case 80. In a state in which the assembling of the battery case 80 is completed, the battery fastening section 150 cannot be seen from outside. That is, the battery case 80 is not provided with the through-hole for fastening the battery assembly 79 to the battery case 80. This makes it possible to suitably prevent the rain water or the like from entering the battery case 80 while allowing the battery assembly 79 to be firmly fastened to the battery case.

(Mounting of Battery Case to Vehicle Body Frame)

Hereinafter, a procedure for mounting the battery case 80 to the vehicle body frame 4 (especially down frames 13) will be described. As shown in FIG. 6, there are provided buffer members 161 between the bottom plate portion 67 of the battery frame 64 and the inner bottom surface of the case body 81. The buffer members 161 are made of, for example, rubber. The battery frame 64 has a higher elasticity than the battery case 80, of course. The buffer members 161 may be fastened to the battery case 80, or to the battery frame 64. In either case, in a state in which the battery assembly 79 is stored in the battery case 80, the buffer members 161 are in contact with the battery frame 64 and the battery case 80. In the present embodiment, eight buffer members 161 in total are placed in right and left rows, and four buffer members 161 on each row are arranged to be spaced apart in the forward or rearward direction. In the side cross-sectional view of FIG. 6, only the four buffer members 161 (one row) are shown.

Figure 10:
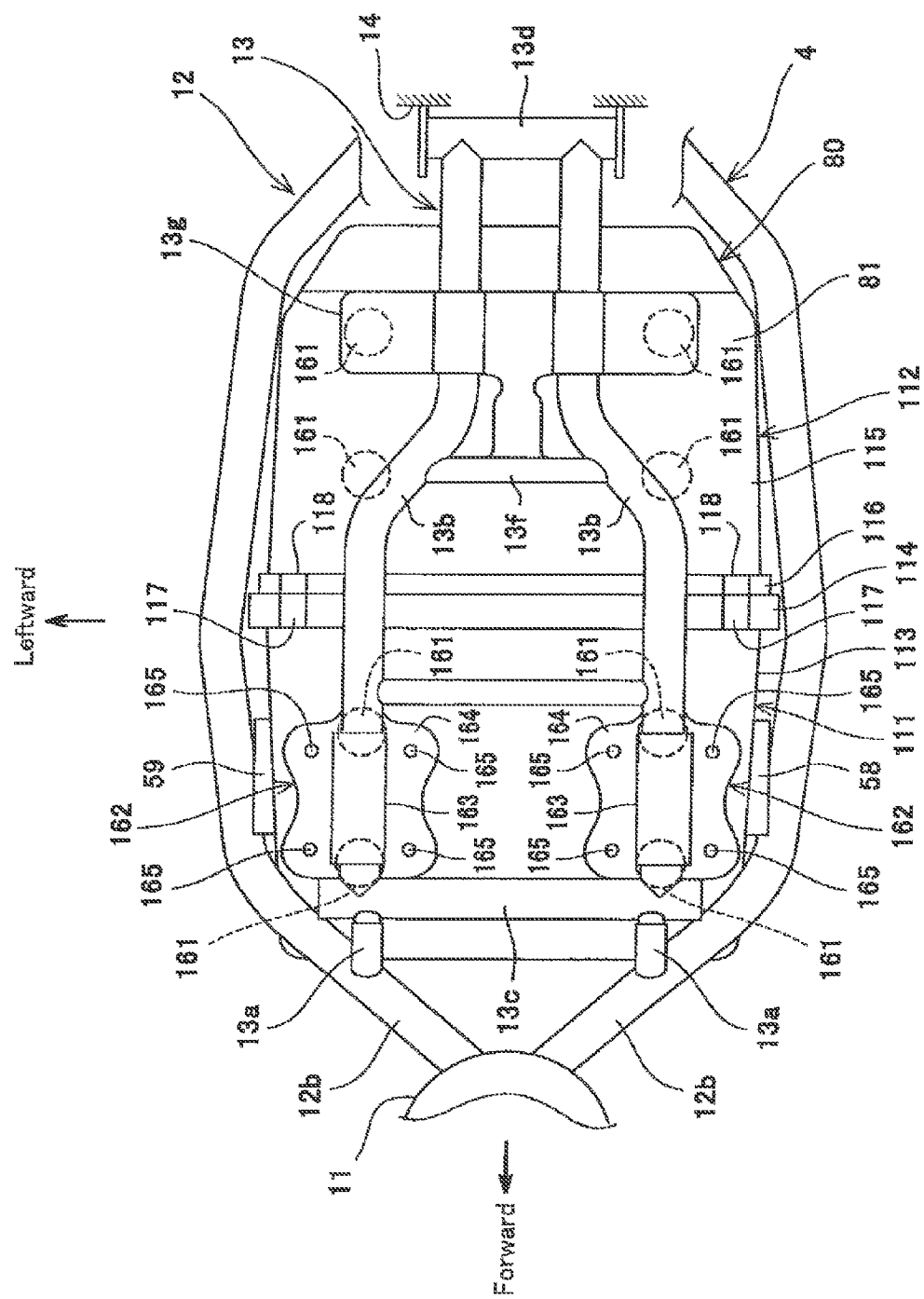
FIG. 10 is a bottom view of down frames and the battery case of FIG. 1.

FIG. 10 is a bottom view of the down frames 13 and the battery case 80 of FIG. 1. The down frames 13 include a front horizontal frame member 13c coupled to the lower end portions of the pair of right and left vertical frame members 13a and a rear horizontal frame member 13d coupled to the pivot frames 14, and the horizontal frame members 13c, 13d extend in the rightward or leftward direction. The front end portions of the pair of right and left lower frame members 13b are welded to the front horizontal frame member 13c, while the rear end portions of the pair of right and left lower frame members 13b are welded to the rear horizontal frame member 13d.

The distance between the pair of lower frame members 13b in the rightward or leftward direction is smaller than the distance between the pair of main frames 12 in the rightward or leftward direction. Because of this, by inserting the battery case 80 into a space between the pair of main frames 12 from above the main frames 12, the bottom portion of the battery case 80 is suitably placed on the pair of lower frame members 13b.

Regarding the distance between the lower frame members 13b in the rightward or leftward direction, the distance between the rear end portions is smaller than the distance between the front end portions. This can make the layout of components in the vicinity of the lower end portions of the pivot frames 14 compact in the rightward or leftward direction. In the vicinity of the lower end portions of the pivot frames 14, a shift pedal (not shown) for a shifting operation, a brake pedal (not shown) for a braking operation, and the like are placed. Because of the compact layout of these components, the rider can perform the shifting operation and the braking operation without a need to stretch the rider's feet to the right and to the left.

To implement such a layout, the pair of lower frame members 13b extend rearward from the front horizontal frame member 13c such that they extend in parallel, are curved toward the center in the rightward or leftward direction so as to reduce a distance between them, and then extend rearward in parallel. With reference to FIG. 1, each of the lower frame members 13b is bent to protrude downward in the vicinity of the flange sections 114, 116 extending above the bottom wall of the battery case 80 so that the bottom portion of the battery case 80 is mountable on the lower frame member 13b and interference between the lower frame member 13b and the flange sections 114, 116 is avoided. With reference to FIG. 9, the pair of lower frame members 13b are connected to each other via two connecting frames 13e, 13f extending in the rightward or leftward direction. These two connecting frames 13e, 13f are placed such that the flange sections 114, 116 are sandwiched between them in the forward or rearward direction. This allows the lower frame members 13b bent in the vertical direction and in the rightward or leftward direction to have a high stiffness, and hence to bear the battery case 80 with a heavy weight.

The distance between the rear end portions of the lower frame members 13b is smaller than the distance between the front end portions of the lower frame members 13b, while the width of the bottom portion of the battery case 80 from the front end portion to the rear end portion is substantially constant in the forward or rearward direction. So, a stay 13g which is elongated in the rightward or leftward direction is joined to the rear end portions of the pair of lower frame members 13b. The stay 13g is externally fitted to the right and left lower frame members 13b. In this state, the stay 13g is welded to the right and left lower frame members 13b and to the rear connecting frame 13f. In this way, the stay 13g is integrated with the down frames 13. The stay 13g having such a structure can stably support the right and left ends of the rear bottom portion of the battery case 80, even though the distance between the rear end portions of the lower frame members 13b is small.

The battery case 80 is supported on the upper surfaces of the lower frame members 13b and the upper surface of the stay 13g in the manner described above, and then fastened to the down frames 13. To fasten the battery case 80 to the down frames 13, a pair of right and left brackets 162 are welded to the front end portions of the lower frame members 13b. Each of the brackets 162 includes a cylindrical portion 163 externally fitted to the lower frame member 13b and a mounting portion 164 having a butterfly shape when viewed from above and protruding in the rightward or leftward direction from the cylindrical portion 163. The mounting portion 164 has a bolt insertion hole 165 penetrating therethrough, into which a bolt 168 (see FIG. 11) is inserted.

Figure 11:
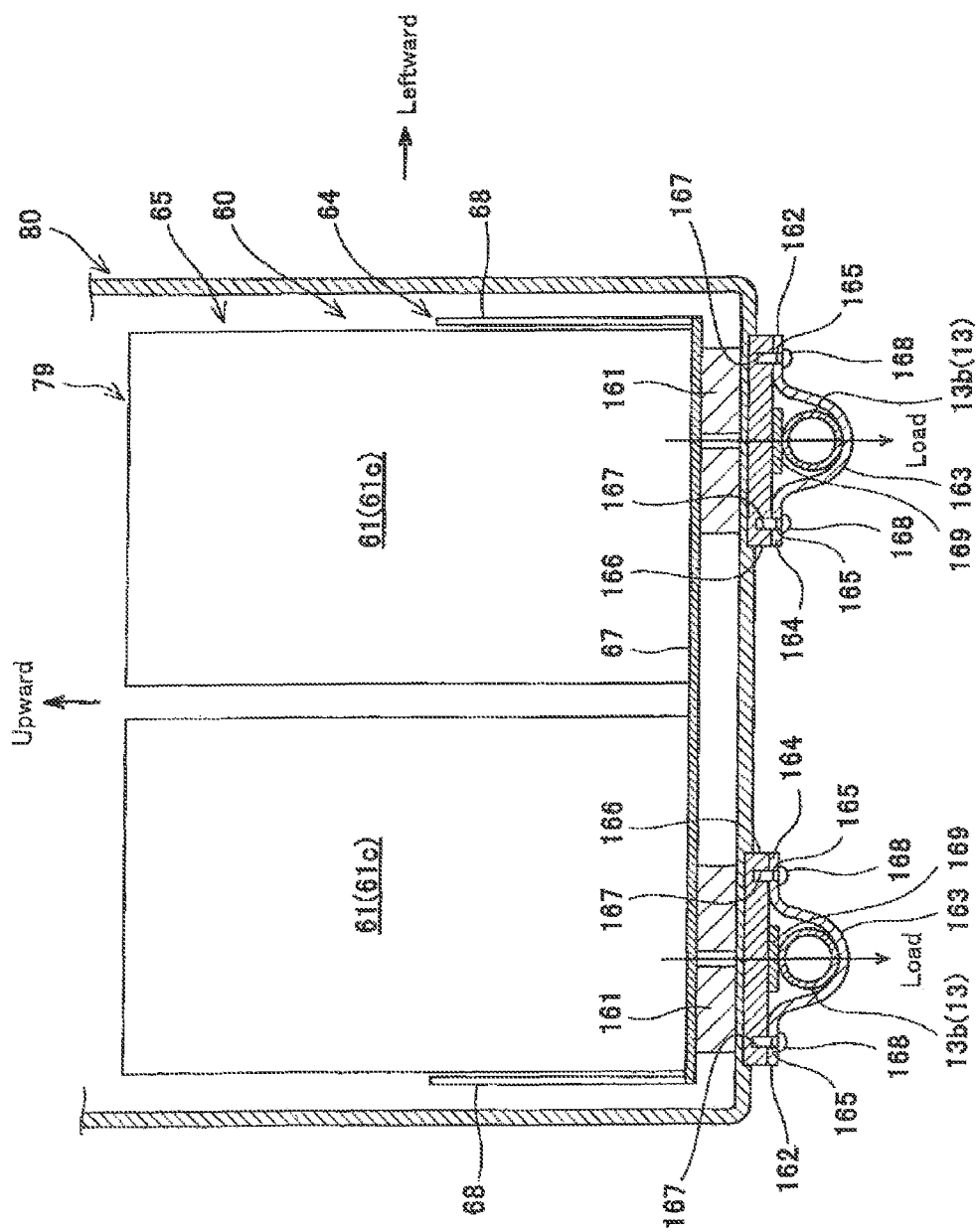
FIG. 11 is a partial cross-sectional view of the down frames and the battery case of FIG. 10, when viewed from forward.

FIG. 11 is a partial cross-sectional view of the down frames 13 and the battery case 80 of FIG. 10, when viewed from forward. As shown in FIG. 11, the bottom wall of the battery case 80 is provided with reinforcement portions 166 in portions which the brackets 162 contact, respectively. The reinforcement portions 166 are, for example, metal plates. Since the brackets 162 are provided at the front end portions of the lower frame members 13b, respectively, the reinforcement portions 166 are provided on the first case member 111 at a front side by insert-molding during the molding of the first case member 111. The reinforcement portions 166 have a higher vertical strength, for example, strength to a compressive load and a tensile load, than the remaining portion of the battery case 80 made of a synthetic resin. Threaded holes 167 open in the lower surfaces of the reinforcement portions 166, respectively. On the other hand, the lower surface of the battery case 80 is not provided with through-holes including a threaded hole.

When the battery case 80 is inserted in a space between the main frames 12, the lower surfaces of the reinforcement portions 166 are brought into surface contact with the upper surfaces of the brackets 162, respectively. At this time, the bolt insertion holes 165 of the brackets are aligned with the threaded holes 167 of the reinforcement portions 166, respectively. Then, the bolts 168 are inserted into the bolt insertion holes 165, respectively, from below, and threadingly engaged with the threaded holes 167, respectively. This allows the battery case 80 to be fastened to the down frames 13 and hence firmly fastened to the vehicle body frame 4. Between each of the down frames 13 and the corresponding reinforcement portion 166, a spacer 169 made of metal is suitably provided. By providing the spacer 169, the reinforcement portion 166 can be supported properly on the down frame 13 via the spacer 169.

When the battery case 80 is mounted to the down frames 13 as described above, the battery assembly 79 is supported on the upper surfaces of the down frames 13, and the battery case 80 is located between the lower surface of the battery assembly 79 and the upper surfaces of the down frames 13. Therefore, the down frames 13 bear the weight of the battery assembly 79 from below. This can reduce a need for increasing a stiffness of the battery case 80 to bear the load. As a result, the material of the battery case 80 can be selected more flexibly. For example, the battery case 80 which can attain a reduced weight and insulativity can be manufactured easily. In the present embodiment, a dedicated component (i.e., battery frame 64) for fastening the battery modules 61 is provided, and a component (i.e., battery case 80) for storing the battery modules is separate from the component for fastening the battery modules 61. As a result, the material of the battery case 80 can be selected more flexibly.

The weight load of the battery assembly 79 is exerted on the down frames 13 via the buffer members 161 which are in contact with the battery frame 64 and the bottom portion of the battery case 80 which is in contact with the buffer members 161. In the bottom portion of the battery case 80, the weight load of the battery assembly 79 is strongly exerted on a portion between a portion which is in contact with the down frames 13 and a portion which is in contact with the buffer members 161. In the present embodiment, in a portion of the bottom portion of the battery case 80, which is in contact with the down frames 133, the reinforcement portions 166 are provided. Since the portion on which the strong load is exerted is especially reinforced, the strength of the entire battery case 80 can be improved without a need to reinforce the entire battery case 80.

The battery case 80 is fastened to the down frames 134 via the reinforcement portions 166. Since the battery case 80 is fastened to the down frames 134 by utilizing the portions with a high strength, it can be firmly fastened to the vehicle body frame 4. In addition, the length of the shaft portion of the bolt 168 is smaller than a sum of the axial length of the bolt insertion hole 165 and the axial length of the threaded hole 167. Therefore, the bolt 168 does not penetrate the reinforcement portion 166 to the interior of the battery case 80. In other words, the bottom portion of the battery case 80 is not provided with a through-hole for joining the battery case 80 to the down frames 13. This makes it possible to suitably prevent the rain water or the like from entering the battery case 80 while allowing the battery case 80 to be firmly fastened to the vehicle body frame 4.

In addition, the elastic buffer members 161 are placed between the battery assembly 79 and the battery case 80. For example, during driving, the elastic buffer members 161 are able to absorb the impact exerted on the battery unit 60 by the wheels 2, 3 (see FIG. 1). This makes it possible to mitigate the impact exerted on the battery case and inhibit a vibration of the battery assembly 79.

With reference to FIGS. 10 and 11, the eight elastic buffer members 161 in total are placed so as to overlap with the down frames 13 when viewed from above. The four buffer members 161 on a left row are placed so as to substantially overlap with the left lower frame member 13b, while the four buffer members 161 on a right row are placed so as to substantially overlap with the right lower frame member 13b. Among the buffer members 161, the buffer members 161 located at a rearmost side do not overlap with the lower frame members 13b but overlap with the stay 13g integrated with the down frames 13 when viewed from above.

If the buffer members 161 are distant from the down frames 13 when viewed from above, the weight load of the battery assembly 79 which is exerted on the buffer members 161, is received by the down frames 13 which are distant when viewed from above. This causes a shear force to be exerted on a portion of the battery case 80 which is between the buffer members 161 and the down frames 13. In the present embodiment, the weight load of the battery assembly 79 which is exerted on the buffer members 161, is linearly exerted on the down frames 13 from above. Thereby, the load exerted on the portion of the battery case 80 which is between the buffer members 161 and the down frames 13 is primarily a compressive load, and the shear force exerted on the portion of the battery case 80 is mitigated. The synthetic resin has relatively high endurance to the compressive load and relatively low endurance to the shear load. In the present embodiment, since the shear force exerted on the battery case 80 is mitigated, the weight of the battery case 80 can be reduced, and the life of the battery case 80 can be extended, by molding the battery case 80 using the synthetic resin. As should be understood, the stay 13g not only stably supports the rear bottom portion of the battery case 80 but also contributes to a reduction of the shear force exerted on the battery case 80. What is needed to achieve this advantage is to place the buffer members 161 such that they overlap with the down frames 13 when viewed from above. Therefore, instead of arranging the plurality of small buffer members 161 such that they are apart from each other in the forward or rearward direction, the buffer members 161 which are elongated in the forward or rearward direction may be placed.

Figure 12:
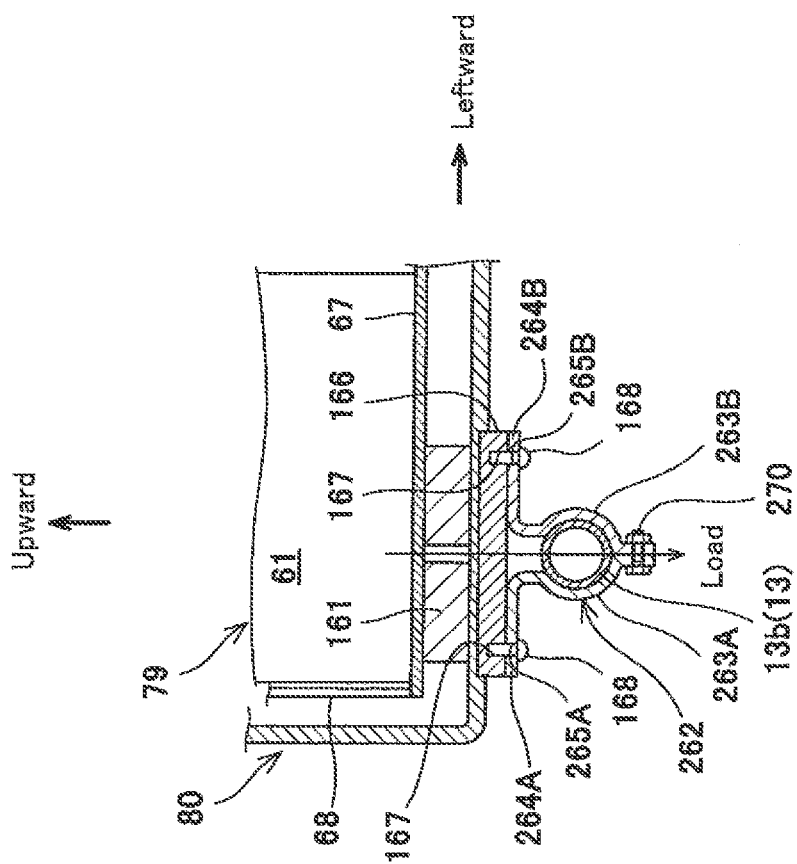
FIG. 12 is a partial cross-sectional view of the down frame and the battery case according to a modified example, when viewed from forward.
Figure 13:
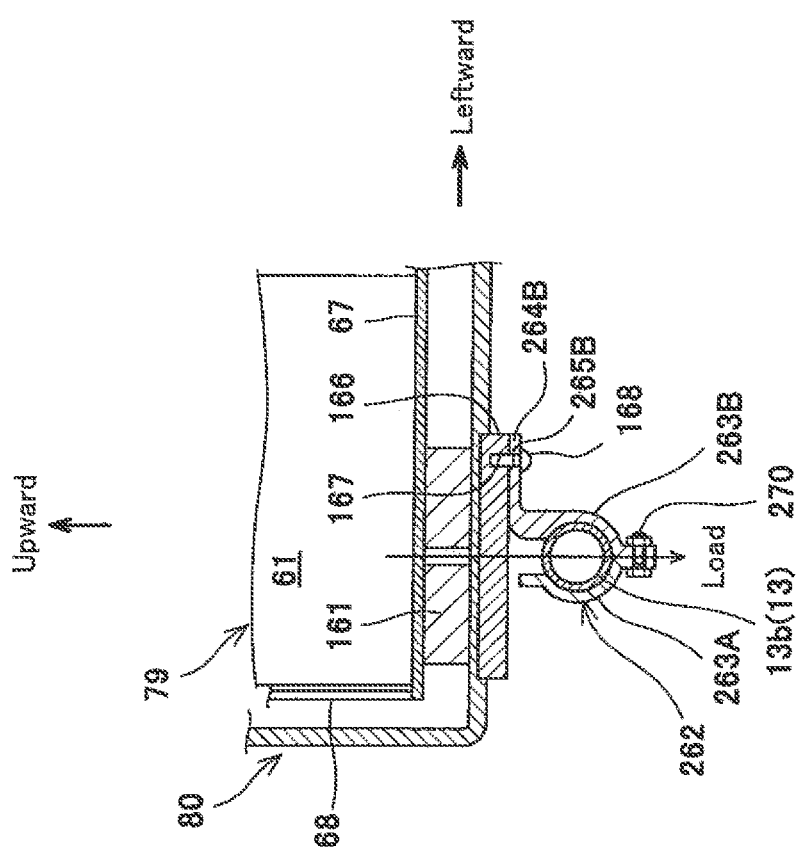
FIG. 13 is a partial cross-sectional view of the down frame and the battery case according to another modified example, when viewed from forward.

FIG. 12 is a partial cross-sectional view of the down frame 13 and the battery case 80 according to a modified example, when viewed from forward. FIG. 13 is a partial cross-sectional view of the down frame and the battery case according to another modified example, when viewed from forward. In the modified example of FIG. 12, a bracket 262 includes a first bracket member at a right side and a second bracket member at a left side which are joined together. The first bracket member and the second bracket member are separable from each other in the rightward or leftward direction. The bracket 262 is formed by fastening these bracket members to each other by a bolt 270. The first bracket member includes a semi-cylindrical portion 263A covering the right portion of the down frame 13, and a mounting portion 264A protruding to the right from the upper end portion of the semi-cylindrical portion 263A. The second bracket member includes a semi-cylindrical portion 264B covering the left portion of the down frame 13, and a mounting portion 264B protruding to the left from the left upper end portion of the semi-cylindrical portion 263B. Bolt insertion holes 265A, 265B penetrate the mounting portions 264A, 264B, respectively. The two semi-cylindrical portions 263A, 263B are joined at their lower end portions to each other in the rightward or leftward direction. A bolt 270 is inserted into the lower end portions of the two semi-cylindrical portions 263A, 263B in the rightward or leftward direction. As in the above described embodiment, the bracket 262 can be fastened to the reinforcement portion 166 by inserting a bolt 268 into the bolt insertion holes 264A, 265B from below and threadingly engaging the bolt 268 with the bolt insertion hole 167. As in the above described embodiment, in the present modified example, a spacer may be interposed between the reinforcement portion and the down frame. As shown in FIG. 13, the bracket 262 may have a cantilever structure in which only the second bracket member is fastened to the reinforcement portion.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

Hereinafter, the embodiment of the present invention will be complementally described and modified examples will be described while repeating part of the description of the above components.

The present invention is not limited to the motorcycle, but is applicable to any vehicle so long as it is a straddle electric vehicle or an electric vehicle including a bar-type handle. Especially, the present invention is suitably applicable to a vehicle in which at least a portion of a battery case is exposed to outside of the vehicle. The present invention is not limited to a vehicle which does not include an internal combustion engine, but is suitably applicable to a hybrid vehicle in which a prime mover includes an electric motor and an internal combustion engine. Furthermore, the present invention is applicable to any vehicle incorporating a battery. Moreover, the battery cells may be a lithium ion battery, a nickel metal hydride, or a fuel cell.

The battery case has a portion which faces the ground surface in the vertical direction. The battery case is placed between the front wheel and the rear wheel. Water splash and the like from the wheels and the ground surface tend to adhere to the case. However, with the configuration of the present invention, entry of liquid into the case can be prevented. Since the entry of water from below into the case can be suitably prevented, the battery case may be placed in a lowest possible location and close to the ground surface. This can lower a center of gravity.

Preferably, the vehicle components such as the motor case and the inverter case are placed in a location below the parting line of the bottom surface of the case, more preferably in a forward location below the parting line of the bottom surface of the case. This makes it possible to prevent liquid scattered from the load surface or from forward from approaching a region in the vicinity of the parting line.

The battery unit 60 is supported on the bottom surface of the battery case 80. Specifically, the battery modules 61 are supported by the battery frame 64 placed under the battery case 80. The weight of the battery modules 61 is transferred to the battery frame 64 and the bottom surface of the battery case 80 in this order. Since the lid member 84 is attached on the upper surface of the battery case 80, the parting line is not exposed on the upper surface of the battery case 80. As described above, the rain water is less likely to be accumulated on the flat upper surface of the lid member 84. If the rain water is accumulated on the upper surface of the battery case 80, the entry of the rain water through a clearance of the parting line can be prevented.

The battery frame for integrating the battery modules, and the battery case for shielding the battery modules from an outside space are separate components. Since the component for integration and the component for sealing are implemented by different components, the battery frame is allowed to have a non-sealed shape like the frame shape and therefore have a reduced weight. The battery case may be made of a material which is lower in strength than the battery frame. Thus, an undesired increase in a stiffness can be avoided, and a reduced weight of the battery case can be achieved. Furthermore, the battery modules integrated by the battery frame are stored into the battery case easily while reducing a gap between the battery modules and the battery case.

The air-intake duct extends upward in a rearward direction and is connected to the battery case, at a portion connected to the battery case. This makes it possible to prevent the water droplets adhering to the interior and exterior of the air-intake duct from entering the battery case. A water drain hole may be formed in the lowermost portion of the air-intake duct. This can further reduce the water droplets entering the battery case through the air-intake duct.

The battery case may be made of a composite material such as fiber-reinforced plastic containing a material for improving a stiffness, instead of the synthetic resin. The battery case may have a structure in which the lid is omitted, and may be constructed by separably joining, for example, two cup-like case members. In this case, the body section of the first case member has, in a state in which the battery case is incorporated into the vehicle, a bottom surface portion, front, left and right side surface portions extending upward from the bottom surface portion such that they are bent, and an upper surface portion, and opens rearward. The body section of the second case member has, in a state in which the battery case is incorporated into the vehicle, a bottom surface portion, rear, left and right side surface portions extending upward from the bottom surface portion such that they are bent, and an upper surface portion, and opens forward.

The case body 81 may be dividable in the forward or rearward direction, or in the rightward or leftward direction. The bottom wall preferably has the parting line which may extend such that it is inclined in the forward or rearward direction, in the rightward or leftward direction or in the vertical direction with respect to at least one surface in which the parting line is formed. To prevent entry of the rain water, preferably, the separation is not formed in the front surface. In many straddle vehicles, a vertical dimension and a dimension in the forward or rearward direction are set greater than a dimension in a vehicle width direction. To realize an increase in a battery capacity under the circumstances, a vertical dimension and a dimension in the forward or rearward direction of the battery case 80 are also set greater than a dimension in the vehicle width direction. In this case, if the battery case 80 is dividable into front and rear sections rather than right and left sections and upper and lower sections, the whole length of the parting line becomes small, and thus a possibility of the entry of rain water can be reduced.

The case body 81 may be dividable vertically instead of horizontally. In this case, it becomes possible to prevent rain water dropping from above from entering the case. In this case, one of the two flanges may protrude outward of the case farther than the other, and may be oriented in a direction different from upward. In a case where the case body 81 is dividable horizontally, the outer surface of the battery unit 60 can be made close to the inner surface of the case according to vertical unevenness of the outer shape, even when the outer shape of the battery unit 60 is made vertically uneven. For example, in a case where a vertically intermediate portion of the battery unit has a plurality of recesses and the case is vertically dividable into upper and lower sections, a gap tends to be formed between the outer surface of the recess and the inner surface of the case, and hence the case tends be increased in size. In the case of the case body which is horizontally dividable, the battery case may be formed to have recesses corresponding to the recesses of the battery unit, and an increase in the size of the case can be avoided.

The flange section and the down frame are placed with a gap between them, and a portion of the down frame is displaced downward to prevent interference between the flange section and the down frame. This makes it possible to prevent a stress from concentrating on the flange section.

Support portions are placed at front and rear sides with the flange sections interposed between them. The battery case can be stably supported at the front and rear sides. Since the battery frame extends along the frames when viewed from above and has a portion extending over the front and rear buffer members in a state in which the battery frame is incorporated into the vehicle, it can transfer the weight of the battery modules above the flange sections to the buffer members at front and rear sides, which can prevent the load from being applied to the flange section. The buffer members may be fastened to the lower surface of the bottom portion of the frame or to the upper surface of the bottom portion of the case.

The down frames 13 may be removably mounted to the main frames 12. For example, the down frames 13 may be inserted into a space between the pair of main frames 12 together with the battery case 80.

The battery case may be placed between the front and rear wheels, and forward relative to the seat. The rear portion of the battery case is smaller in dimension in the right and leftward direction than the front portion of the battery case. Also, the upper portion of the battery case is smaller in dimension in the right and leftward direction than the lower portion of the battery case. In the above described embodiment, the rear upper portion of the battery case is smaller in dimension in the right and leftward direction than a portion in the vicinity of the rear upper portion. This allows the battery case to be directly or indirectly retained by the knees of the rider straddling the vehicle body. As a result, a storage region in the interior of the battery case can be increased as much as possible, and hence the capacity of the battery in the interior of the battery case can be increased, while allowing the vehicle body to be retained easily by the rider.

The vehicle body includes a stand which allows the vehicle body to stand for itself in a state in which the vehicle body is inclined at one side in the right and leftward direction during a stopped state of the vehicle. The battery case may be provided with a water drain hole in a portion which is in a lowest position in the state in which the vehicle body is standing for itself such that it is inclined. For example, in a case where the stand is provided at a left side, the water drain hole is provided in the left end portion of the bottom portion of the battery case to discharge water or water droplets from the interior of the case. The water drain hole may have a labyrinth shape or may be attached with a cap which can open and close the water drain hole. With this structure, entry of the water into the case through the water drain hole can be prevented.

Regarding the electric wires extending from the battery case to the inverter, the wire harness 74 extending from the battery case and connected to the inverter is provided with an insulative protection cover covering the electric wires. In at least a region in the vicinity of the rider straddling the vehicle body, the wire harness extends in a space between the protection cover and the battery case. In the present embodiment, the protection cover is placed in at least a region in the vicinity of the rider's knees. The protection covers are placed at right and left sides. The distance between the right and left protection covers, corresponding to the rear upper portion, is set smaller than the distance between the right and left protection covers, corresponding to the remaining portion. This allows the cover to be retained by the knees of the rider straddling the vehicle body, and hence the vehicle body to be easily retained by the rider. The rear surface of the protection cover and the rear surface of the air discharge duct are coplanar with each other in a location rearward relative to the battery case in the rightward or leftward direction, and the seat is placed rearward relative to and below the rear surface of the protection cover and the rear surface of the air discharge duct. This allows the rear surface of the protection cover and the rear surface of the air discharge duct to serve as a wall for inhibiting the rider straddling the seat from being displaced forward. In addition, by making the rear surface of the protection cover and the rear surface of the air discharge duct coplanar with each other, the duct can be increased in size, and the battery can be cooled more effectively.

Although in the above described embodiment, the storage section for storing the ECU is provided outside of the battery case, it may be provided inside of the battery case. This makes it possible to prevent the ECU from being detached undesirably. Thus, an anti-theft function can be improved. Or, in a case where an ECU for controlling the motor and an ECU for controlling the battery are separate components, a balance of the vehicle body in the rightward or leftward direction can be improved by placing the ECUs at right and left sides of the battery case. Or, the ECU for controlling the battery may be placed inside of the case and the ECU for controlling the motor may be placed outside of the battery. In this case, the ECU inside of the battery case preferably contains a control program for inhibiting the vehicle body from moving unless a correct key is used.

In a case where a fastening member (e.g., bolt 133) for fastening the case members of the battery case is used, at least the surface of the fastening member is preferably made of an insulating material. In the present embodiment, the fastening member for fastening the lid member provided at the upper portion of the battery case is made of an insulating material. This can reduce a possibility that a short circuit of an electric circuit is formed inside of the case even if the fastening member falls down into the case.

The air inlet 111 of the battery case may be provided with an air filter. This makes it possible to prevent ingress of foreign matters into the case. The air-intake duct extends from a front cowling (not shown) and is connected to the battery case through one side in the rightward or leftward direction relative to the heat pipe. The electric wires used to transmit signals and electric power to meters and the like extend through the other side in the rightward or leftward direction relative to the head pipe. Since the duct is placed at the side different from the side where the electric wires are placed, easy routing of the duct can be implemented.

Cleaned air in the interior of the case may be guided to the inverter to cool the inverter. Especially, by flowing the air along the board surface of the inverter, rust of the board surface can be prevented. For example, by using a liquid cooling medium for cooling IGBT elements, or a gaseous cooling medium for cooling the board surface of the inverter, the cooling of the inverter can be promoted.

Since the DC/DC converter is stored in the case, the converter which is a high-voltage device is not exposed to outside. In the same manner, the DC/DC converter relay, the charging relay, the main relay, etc., are placed in the interior of the case.

The motor is placed below the battery support frame and the battery support frame supports the motor. A portion or front portion of the down frame serving as the support frame for supporting the battery may be removably joined to the remaining portion of the vehicle body frame 4.

The lower portion of the battery support frame is removably attached to the remaining portion of the battery support frame by the fastening member. In a state in which the lower portion of the battery frame, the battery case and the battery are unitarily fastened to each other, the remaining frame members are placed from above. In other words, the battery case is inserted from below the remaining frame members. In this state, the battery frame is lifted by a hook, and the remaining frame members and the frame are connected to each other, thereby allowing the battery to be supported on the vehicle body frame.

Since the lower portion of the battery frame, the battery case and the battery are unitarily fastened to each other, the lower portion of the frame can bear the weight of the battery even in an upper body detached from the remaining frame members. Therefore, it is not necessary to increase a stiffness of the frames in excess.

Furthermore, an air guide path leading to the case may be formed within the support frame. The suspending member for supporting the battery frame may be removably mounted to the battery frame. The suspending member may be mounted to the battery frame during maintenance and may be detached from the battery frame when the battery case is mounted to the vehicle body.

INDUSTRIAL APPLICABILITY

The present invention has advantages that the battery can be easily removably mounted to the case and the case can have a high stiffness, and is effectively applied to straddle electric vehicles, especially large electric motorcycles which are able to generate great driving power.

REFERENCE CHARACTERS LIST

1 electric motorcycle
2 front wheel
3 rear wheel
4 vehicle body frame
5 electric motor
20 inverter
30 inside electric component
31 high-voltage electric wire
55 exhaust fan
60 battery unit
61 battery module
64 battery frame
74 wire harness
80 battery case
81 case body
82 opening
83 upper lid
111 first case member
112 second case member
113 first body section
114 first flange section
115 second body section
116 second flange section
117 first case joining section
118 second case joining section
121 first outward protruding portion
122 rearward protruding portion
140, 145 positioning sections
150 battery fastening section

The invention claimed is:

1. A straddle electric vehicle which rotates a drive wheel by driving power generated in an electric motor, comprising:
   a battery unit which is an electric power supply for the electric motor; and
   a battery case for storing the battery unit;
   wherein the battery case includes a pair of case members including a first case member and a second case member which are joined together such that the first case member and the second case member are separable from each other, and a parting line of the first case member and the second case member extends on a bottom wall of the battery case;
   wherein the bottom wall of the battery case includes a bottom wall of the first case member and a bottom wall of the second case member such that the parting line is a boundary between the bottom wall of the first case member and the bottom wall of the second case member; and
   wherein the first case member and the second case member include a first flange section and a second flange section, respectively, which define the parting line, and protrude outward of the battery case, the first case member and the second case member being separably joined to each other in a state in which the first flange section and the second flange section are engaged with each other.

2. The straddle electric vehicle according to claim 1, wherein one of the first flange section and the second flange section is exposed outward of the battery case farther than the other of the first flange section and the second flange section and is oriented in a direction different from forward.

3. The straddle electric vehicle according to claim 1, comprising:
   a battery fastening section for fastening the battery unit to the battery case;
   wherein the battery fastening section is placed in an inner space of the battery case.

4. The straddle electric vehicle according to claim 1, comprising:
   a case joining section for joining the first case member to the second case member; and
   wherein the case joining section is provided on an outer surface of the battery case.

5. The straddle electric vehicle according to claim 1,
wherein the first case member and the second case member are joined together such that the first case member and the second case member are separable from each other in a forward or rearward direction, and the first case member is placed forward relative to the second case member; and
wherein the first flange section includes an outward protruding portion which protrudes outward of the case farther than the remaining portion of the battery case and a rearward protruding portion extending rearward from the outward protruding portion; and
wherein the rearward protruding portion is located outward of the case relative to the second flange section and is oriented rearward.

6. The straddle electric vehicle according to claim 1, comprising:
an inside electric component stored in the battery case;
an outside electric component disposed outside of the battery case; and
an electric wire electrically connecting the battery unit or the inside electric component to the outside electric component;
wherein the electric wire extends from a rear surface of the battery case to the outside electric component.

7. The straddle electric vehicle according to claim 6,
wherein the battery case has an upper lid which is removably attached on an upper portion thereof; and
wherein the inside electric component is placed in an upper portion in an interior of the battery case.

8. The straddle electric vehicle according to claim 1,
wherein the parting line extends horizontally on the bottom wall.

9. The straddle electric vehicle according to claim 1,
wherein the parting line is provided in a center portion of the bottom wall.

10. The straddle electric vehicle according to claim 1,
wherein the parting line is provided within a vertical plane.

11. The straddle electric vehicle according to claim 1,
wherein the first case member and the second case member are joined together such that the first case member and the second case member are separable from each other in a forward and rearward direction or in a rightward or leftward direction.

12. A straddle electric vehicle, which rotates a drive wheel by driving power generated in an electric motor, comprising:
a battery unit which is an electric power supply for the electric motor; and
a battery case for storing the battery unit;
wherein the battery case includes a pair of case members including a first case member and a second case member which are joined together such that the first case member and the second case member are separable from each other, and a parting line of the first case member and the second case member extends on a bottom wall of the battery case;
wherein the bottom wall of the battery case includes a bottom wall of the first case member and a bottom wall of the second case member such that the parting line is a boundary between the bottom wall of the first case member and the bottom wall of the second case member; and
wherein the first case member and the second case member includes a first flange section and a second flange section, respectively, which define the parting line, and are separably joined to each other in a state in which the first flange section and the second flange section are engaged with each other, and the straddle electric vehicle further comprising:
a front wheel and a rear wheel which are placed such that the battery case is interposed between the front wheel and the rear wheel in a forward or rearward direction; and
an exhaust fan for exhausting air from an interior of the battery case;
wherein the exhaust fan is placed at an upper portion of the battery case.

13. A straddle electric vehicle which rotates a drive wheel by driving power generated in an electric motor, comprising:
a battery unit which is an electric power supply for the electric motor; and
a battery case for storing the battery unit;
wherein the battery case includes a pair of case members including a first case member and a second case member which are joined together such that the first case member and the second case member are horizontally separable from each other, and a parting line of the first case member and the second case member extends along a bottom wall of the battery case; and
wherein the first case member and the second case member include a first flange section and a second flange section, respectively, which define the parting line, and protrude outward of the battery case, the first case member and the second case member being separably joined to each other in a state in which the first flange section and the second flange section are engaged with each other.

* * * * *